(12) United States Patent
Hunt

(10) Patent No.: US 8,219,257 B2
(45) Date of Patent: Jul. 10, 2012

(54) POWER CONTROL PROTOCOL FOR A HYDROKINETIC DEVICE INCLUDING AN ARRAY THEREOF

(76) Inventor: Turner Hunt, Cincinnati, OH (US)

( * ) Notice: Subject to any disclaimer, the term of this patent is extended or adjusted under 35 U.S.C. 154(b) by 224 days.

(21) Appl. No.: 12/789,192

(22) Filed: May 27, 2010

(65) Prior Publication Data

US 2010/0332041 A1    Dec. 30, 2010

Related U.S. Application Data

(60) Provisional application No. 61/221,676, filed on Jun. 30, 2009, provisional application No. 61/236,222, filed on Aug. 24, 2009, provisional application No. 61/328,884, filed on Apr. 28, 2010.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |

(52) U.S. Cl. .............. 700/288; 290/42; 290/43; 290/53; 290/54

(58) Field of Classification Search .......... 700/286–288; 290/42, 43, 52–54
See application file for complete search history.

(56) References Cited

U.S. PATENT DOCUMENTS

| | | | | |
|---|---|---|---|---|
| 3,785,216 | A * | 1/1974 | McLean et al. ............. 73/862.16 |
| 4,025,220 | A | 5/1977 | Thompson | |
| 4,383,182 | A | 5/1983 | Bowley | |
| 4,816,696 | A * | 3/1989 | Sakayori et al. ................. 290/52 |
| 4,864,152 | A | 9/1989 | Pedersen | |
| 6,091,161 | A | 7/2000 | Dehlsen et al. | |
| 6,568,478 | B2 * | 5/2003 | De Almeida .................. 166/372 |
| 6,972,498 | B2 | 12/2005 | Jamieson et al. | |
| 7,291,936 | B1 | 11/2007 | Robson | |
| 7,465,147 | B2 * | 12/2008 | Platt et al. .......................... 415/7 |
| 7,582,977 | B1 | 9/2009 | Dehlsen | |
| 7,675,188 | B2 * | 3/2010 | Baarman et al. ................. 290/54 |
| 7,843,077 | B2 * | 11/2010 | Arduini ............................ 290/43 |
| 8,089,243 | B2 * | 1/2012 | Ichikawa et al. .............. 320/104 |
| 2002/0088222 | A1 | 7/2002 | Vauthier | |
| 2002/0158472 | A1 | 10/2002 | Robson | |
| 2004/0201222 | A1 * | 10/2004 | Eylman ........................... 290/53 |
| 2005/0121917 | A1 | 6/2005 | Kikuchi | |
| 2006/0131890 | A1 | 6/2006 | Gizara | |

(Continued)

FOREIGN PATENT DOCUMENTS

JP    54-074043    6/1979

(Continued)

OTHER PUBLICATIONS

International Search Report dated Dec. 2, 2010, mailed on related PCT Application PCT/US2010/036445.

(Continued)

*Primary Examiner* — Crystal J Barnes-Bullock
(74) *Attorney, Agent, or Firm* — Baker & Hostetler, LLP

(57) ABSTRACT

A method is disclosed for controlling a hydrokinetic device that includes an energy transducer. The method comprises setting a target condition for the hydrokinetic device, monitoring an actual condition of the hydrokinetic device, comparing the target condition to the actual condition to determine an error signal, and invoking a power control protocol with depth change protocol based on the error signal to maintain the hydrokinetic device at the target condition.

57 Claims, 15 Drawing Sheets

U.S. PATENT DOCUMENTS

| | | |
|---|---|---|
| 2006/0225416 A1 | 10/2006 | North et al. |
| 2007/0023107 A1 | 2/2007 | Westin |
| 2008/0018115 A1 | 1/2008 | Orlov |
| 2008/0050993 A1 | 2/2008 | Mackie |
| 2008/0078316 A1 | 4/2008 | Gizara |
| 2010/0310376 A1* | 12/2010 | Houvener et al. ......... 416/146 R |

FOREIGN PATENT DOCUMENTS

| | | |
|---|---|---|
| WO | WO2006/061652 | 6/2006 |
| WO | WO2008/149132 | 12/2008 |
| WO | WO2009/004420 | 1/2009 |

OTHER PUBLICATIONS

International Search Report dated Dec. 6, 2010, mailed on related PCT Application PCT/US2010/036452.

International Search Report dated Dec. 6, 2010, mailed on related PCT Application PCT/US2010/036462.

International Search Report dated Apr. 12, 2011, mailed on related PCT Application PCT/US2010/036459.

* cited by examiner

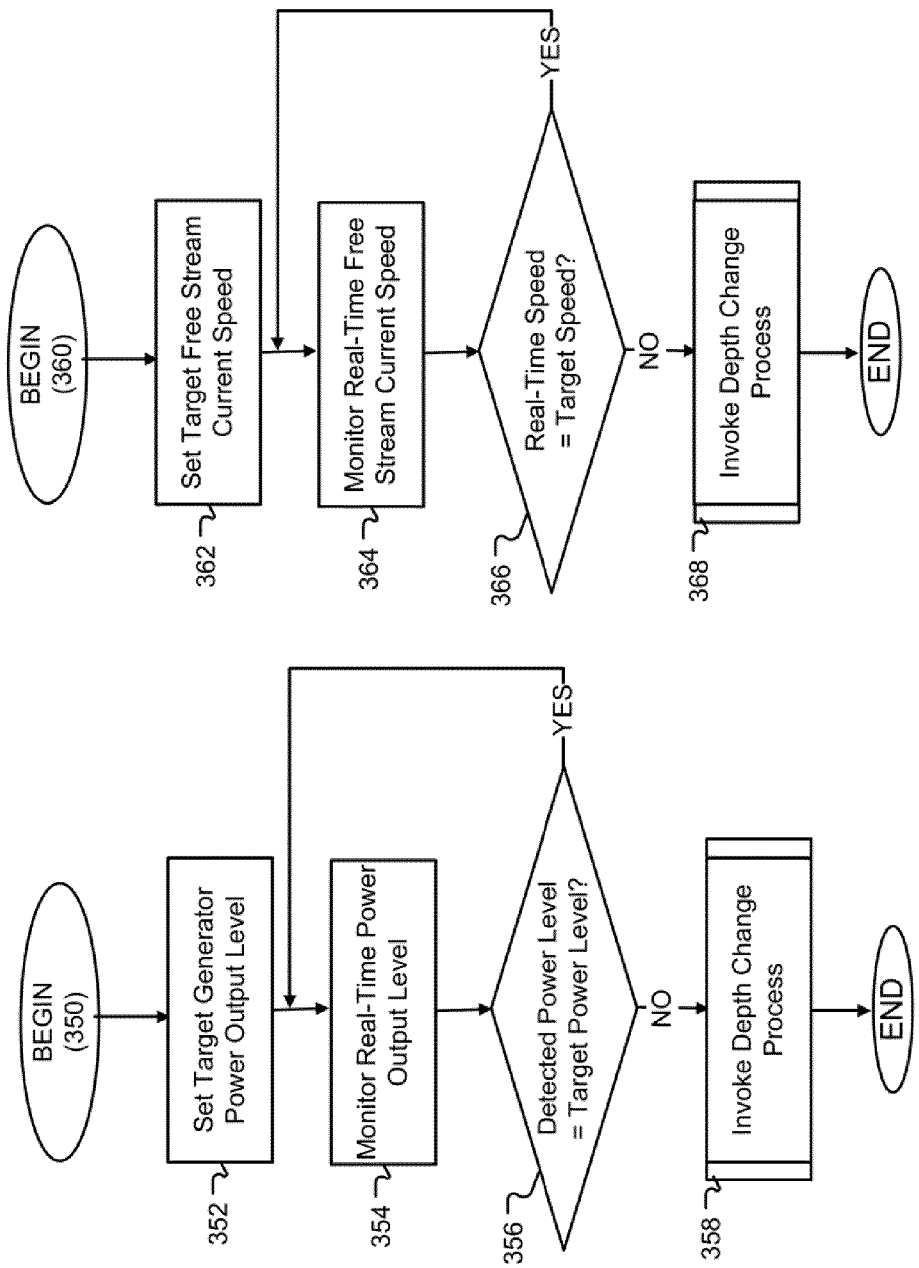

POWER CONTROL PROTOCOL FOR A HYDROKINETIC DEVICE INCLUDING AN ARRAY THEREOF

CROSS REFERENCE TO PRIOR APPLICATIONS

This application claims priority and the benefit thereof from U.S. Provisional Application No. 61/221,676, filed on Jun. 30, 2009, and entitled OCEAN CURRENT TURBINE AND HYDROKINETIC POWER GENERATION APPARATUSES AND RELATED METHODS, ALONG WITH MOORING & YAW ARRANGEMENTS, FURLING ROTOR DEPTH CONTROL, AND MOORING HARNESSES FOR USE THEREWITH, the entirety of which is hereby incorporated herein by reference. This application also claims priority and the benefit thereof from U.S. Provisional Application No. 61/236,222, filed on Aug. 24, 2009, and entitled SELF-CONTAINED VARIABLE PITCH CONTROL ROTOR HUB; METHOD OF MAXIMIZING ENERGY OUTPUT AND CONTROLLING OPERATING DEPTH OF AN OCEAN CURRENT TURBINE; AND VARIABLE DEPTH HYDROPLANE SLED, the entirety of which is also hereby incorporated herein by reference. This application also claims priority and the benefit thereof from U.S. Provisional Application No. 61/328,884, filed on Apr. 28, 2010, and entitled FLOODED ANCHORING SYSTEM AND METHOD OF DEPLOYMENT, POSITIONING AND RECOVERY, the entirety of which is hereby incorporated herein by reference.

BACKGROUND OF THE DISCLOSURE

1. Field of the Disclosure

The present disclosure relates to a method, a system and a device for generating power from the kinetic energy of a fluid current. More particularly, the disclosure relates to a method, a system and a device for controlling, modulating and maximizing a power output from a hydrokinetic device, including an array of hydrokinetic devices.

2. Related Art

Kinetic energy of flowing ocean currents represents a significant source of clean renewable energy. The water that comprises the world's oceans is constantly in motion, and in many locations there exist repeatable, consistent and rapidly moving ocean currents with speeds in excess of 1.0 meters-per-second (m/s). Examples of ocean currents include the Gulf Stream, the Humboldt, the Kuroshio, the Agulhas and others. These currents have their origins in ocean thermal and salinity gradients, Coriolis forces, and other ocean thermal transport mechanisms.

These currents represent "rivers in the ocean" which lie predominantly in continental shelf areas with bottom depths in excess of 300 meters. Such depths necessitate mooring a hydrokinetic device with cables or tethers to upstream anchors fixed to the sea bed. These ocean currents tend to exhibit an inverse velocity shear profile. Namely, the current velocity decreases in speed as one travels deeper in a near linear relationship. This free stream current flow behavior provides an opportunity to control, modulate and maximize energy output by actively positioning the hydrokinetic device at the operating depth at which the rated speed occurs, thereby facilitating rated power to be output by the attached electrical generator.

Current hydrokinetic devices are typically deployed at a particular depth and maintained at that depth, with variable speed adjustments. U.S. Pat. No. 6,091,161 appears to disclose a method for controlling an operating depth of a tethered water current driven turbine device. The device is kept midway between a prescribed maximum depth and a prescribed minimum depth, and preferably at a midpoint between the two prescribed depths. As a consequence of using a constant depth approach, the device must operate at whatever free stream current speeds occur in the specified depth range, including speeds above a rated speed of the turbine, where power shedding and relinquishment is required, or speeds below a rated speed, where the generator is only capable of outputting partial power. The patent appears to disclose, for example, that in response to an increased current speed, the device would increase buoyancy and/or hydrodynamic lift to remain at the same depth, thereby avoiding from being pulled to deeper depths.

U.S. Pat. No. 7,291,936 appears to disclose a fully submersible electrical power generating plant device. The disclosed device appears to employ a constant depth, variable speed method analogous to that disclosed in U.S. Pat. No. 6,091,161. The method disclosed in the '936 patent appears to require, in response to increasing current speeds, increasing hydrodynamic lift of the device by pitching the entire device and an attached hydroplane wing to a larger angle of attack, thereby creating greater hydrodynamic lift to kept the device at the same depth and avoid from being pulled deeper.

The present disclosure provides a hydrokinetic device that harnesses the kinetic energy of flowing water currents to provide clean, renewable energy, as well as a method, a system and a device for providing substantially constant speed and variable depth adjustment of the hydrokinetic device to maximize and/or modulate power generation.

SUMMARY OF THE DISCLOSURE

A method, a system, and a hydrokinetic device are provided for harnessing the kinetic energy of flowing water currents to provide clean, renewable energy, as well as a system and a method for stabilizing the pitch, roll and drag of the hydrokinetic device.

According to an aspect of the disclosure, a method is provided for controlling a hydrokinetic device that includes an energy transducer, the method comprising: setting a target generator output level for the hydrokinetic device; monitoring an actual generator output level of the hydrokinetic device; comparing the target generator output level to the actual generator output level to determine an error signal; and adjusting a depth of the hydrokinetic device based on the error signal to maintain the hydrokinetic device at the target generator output level. The adjusting a depth of the hydrokinetic device may comprise invoking a power control protocol with depth change protocol, and/or altering one of a weight, a lift or a drag of the hydrokinetic device based on the error signal. When the error signal is zero or near zero, the method may further comprise exchanging lift for weight in equal amounts to minimize flow disturbances. The energy transducer may comprise a variable control rotor.

The hydrokinetic device may be deployed in an array of hydrokinetic devices, each having an energy transducer. The method may further comprise: sending an actual generator power output level measurement signal to a station; and receiving an individual power modulation factor from the station. The actual generator power output level may be aggregated at the station with another actual generator power output level received from another one of the hydrokinetic devices in the array of hydrokinetic devices. The individual power modulation factor may be generated based on a target aggregate power output level for all of the hydrokinetic devices in the array of hydrokinetic devices and an actual aggregate power output level for all of the hydrokinetic devices in the array of hydrokinetic devices. The method may further comprise: receiving an individual power modulation factor from a station, wherein the depth of the hydrokinetic device is further adjusted based on the individual power modulation factor.

The method may further comprise: determining a rotor size based on a single free stream current speed that occurs most frequently in a vertical water column; or adjusting a rotor swept area based on the single free stream current speed that occurs most frequently in the vertical water column.

The method may further comprise: monitoring a plurality of parameters; comparing each of the plurality of parameters to preset limits established for each of said plurality of parameters; and invoking a fault condition when one or more of the plurality of parameters exceed the preset limits established for said one or more of the plurality of parameters. The fault condition may comprise: disengaging the energy transducer from a fluid flow until said one or more of the plurality of parameters are equal to or less than the respective preset limits. The plurality of parameters may comprise: a free stream current speed in a column of water; an actual depth of the hydrokinetic device in the column of water; a mooring cable tension; a presence of a marine creature that may create a collision hazard; a passage of a potentially catastrophic weather event; an actual, real-time generator power output level; or a power modulation factor.

According to a further aspect of the disclosure, a method is provided for operating a hydrokinetic device that includes an energy transducer. The method comprises: progressively increasing or decreasing the amount by which the energy transducer is engaged or disengaged from a fluid flow, and progressively changing at least one of a weight, a lift or a drag of the hydrokinetic device, so that the hydrokinetic device attains or maintains a predetermined condition. The predetermined condition may comprise: an aggregate vertical force balance that is substantially zero; an aggregate drag force balance that is substantially zero; or a depth that corresponds to a free stream current speed.

According to a still further aspect of the disclosure, a method is provided for controlling an array of hydrokinetic devices, each hydrokinetic device comprising an energy transducer. The method comprises: setting a target aggregate power level for the array of hydrokinetic devices; monitoring an actual aggregate power output level of the array of hydrokinetic devices; comparing the target aggregate power level and the actual aggregate power output level to determine an error signal; assigning a power modulation factor to one or more of the hydrokinetic devices in the array of hydrokinetic devices; and adjusting a depth of the one or more hydrokinetic devices based on the error signal to maintain the array of hydrokinetic devices at the target aggregate power level. The adjusting a depth of the one or more hydrokinetic devices may comprise invoking a power control protocol with depth change protocol.

The method may further comprise progressively changing at least one of a weight, a lift or a drag of at least one of the hydrokinetic devices in the array of hydrokinetic devices, so that the hydrokinetic device attains or maintains a specified power output level. The specified power output level comprises: a product of a rated power and the power modulation factor. The specified power output level may be communicated in real time to a station.

According to a still further aspect of the disclosure, a system is provided for controlling a hydrokinetic device. The system comprises: an onboard controller that is configured to (i) set a target condition for the hydrokinetic device, (ii) monitor an actual condition of the hydrokinetic device, (iii) compare the target condition to the actual condition to determine an error signal, and (iv) adjust a depth of the hydrokinetic device based on the error signal; an energy transducer that is configured to harness kinetic energy from a water current; and a variable effector that is configured to maintain the hydrokinetic device at the target condition. The variable effector may comprise: a variable weight effector that is configured to adjust a weight of the hydrokinetic device; a variable lift effector that is configured to adjust lift of the hydrokinetic device; a variable drag effector that is configured to adjust drag of the hydrokinetic device; or an energy transducer change effector that is configured to adjust a rate at which the kinetic energy is harnessed by the energy transducer. The target condition may comprise a target generator power output level; and the actual condition may comprise an actual generator power output level. The target condition may comprise a target free stream current speed; and the actual condition may comprise an actual free stream current speed. The onboard controller may be further configured to (iv) monitor a plurality of parameters, (v) compare each of the plurality of parameters to preset limits established for each of said plurality of parameters, and (vi) invoke a fault condition when one or more of the plurality of parameters exceed the preset limits established for said one or more of the plurality of parameters. The fault condition may comprise: disengaging the energy transducer from a fluid flow until said one or more of the plurality of parameters are equal to or less than the respective preset limits. The plurality of parameters may comprise: a free stream current speed in a column of water; an actual depth of the hydrokinetic device in the column of water; a mooring cable tension in a mooring cable; a presence of a marine creature that may create a collision hazard; a passage of a potentially catasrophic weather event; an actual power output level; or a power modulation factor.

In the system, the hydrokinetic device may be deployed in an array of hydrokinetic devices, each having an energy transducer. The system may further comprise an onboard communicator that is configured to send the actual generator power output level to a station, and to receive an individual power modulation factor from the station. The actual generator power output level may be aggregated at the station with another actual generator power output level received from another one of the hydrokinetic devices in the array of hydrokinetic devices. The individual power modulation factor may be generated based on a target aggregate power output level for all of the hydrokinetic devices in the array of hydrokinetic devices and an actual aggregate power output level for all of the hydrokinetic devices in the array of hydrokinetic devices.

The system may further comprise: an onboard communicator that is configured to receive an individual power modulation factor from a station, wherein the variable effector is controlled based on the individual power modulation factor.

According to a still further aspect of the disclosure, a method is provided for controlling a hydrokinetic device that includes a variable control rotor. The method comprises: setting a target condition for the hydrokinetic device; monitoring an actual condition of the hydrokinetic device; comparing the target condition to the actual condition to determine an error signal; and adjusting a depth of the hydrokinetic device based on the error signal to maintain the hydrokinetic device at the target condition, wherein the target condition comprises a target generator power output level or a target free stream current speed; and wherein the actual condition comprises an actual generator power output level or an actual free stream current speed. The adjusting a depth of the hydrokinetic device may comprise invoking a power control protocol with depth change protocol.

The method may further comprise: monitoring a plurality of parameters; comparing each of the plurality of parameters to preset limits established for each of said plurality of parameters; and invoking a fault condition when one or more of the plurality of parameters exceed the preset limits established for said one or more of the plurality of parameters. The fault condition may comprise disengaging the energy transducer from a fluid flow until said one or more of the plurality of parameters are equal to or less than the respective preset limits. The plurality of parameters may comprise: a free stream current speed in a column of water; an actual depth of the hydrokinetic device in the column of water; a mooring cable tension of a mooring cable; a presence of a marine creature that may create a collision hazard; a passage of a potentially catasrophic weather event; an actual generator power output level; or a power modulation factor.

The hydrokinetic device may be deployed in an array of hydrokinetic devices. In this regard, the method may further comprise: sending an actual generator power output level measurement signal to a station; and receiving an individual power modulation factor from the station. The actual generator power output level may be aggregated at the station with another actual generator power output level received from another one of the hydrokinetic devices in the array of hydrokinetic devices. The individual power modulation factor may be generated based on a target aggregate power output level for all of the hydrokinetic devices in the array of hydrokinetic devices and an actual aggregate power output level for all of the hydrokinetic devices in the array of hydrokinetic devices. The method may further comprise: receiving an individual power modulation factor from a station, wherein the adjusting the depth of the hydrokinetic device is further based on the individual power modulation factor.

According to a still further aspect of the disclosure, a power generating device is provided that harnesses kinetic energy from a water current and generates electrical energy. The device comprises: an energy transducer that is configured to harness the kinetic energy; an electrical generator that is coupled to the energy transducer; a variable effector that is configured to effect at least one of a weight, a lift or a drag of the device; a power output sensor that is configured to detect an actual generator power output level of the electrical generator; and an onboard controller that is adapted to control the variable effector to change at least one of the weight, the lift, or the drag of the device to adjust an operating depth of the device based on a difference of the actual generator power output level and a target generator power output level. The energy transducer may comprise a variable control rotor.

According to a still further aspect of the disclosure, a method is provided for controlling a hydrokinetic device that includes an energy transducer. The method comprises: setting a target free stream current speed for the hydrokinetic device; monitoring an actual free stream current speed; comparing the target free stream current speed to the actual free stream current speed to determine an error signal; and adjusting a depth of the hydrokinetic device based on the error signal to maintain the hydrokinetic device at the target free stream current speed. The adjusting a depth of the hydrokinetic device may comprise invoking a power control protocol with depth change protocol. The adjusting the depth of the hydrokinetic device may comprise altering one of a weight, a lift or a drag of the hydrokinetic device based on the error signal. The error signal may be zero or near zero, in which case the method may further comprise exchanging lift for weight in equal amounts to minimize flow disturbances. The energy transducer may comprise a variable control rotor.

The method may further comprise: determining a rotor size based on a single free stream current speed that occurs most frequently in a vertical water column; or adjusting a rotor swept area based on the single free stream current speed that occurs most frequently in the vertical water column.

The method may further comprise: monitoring a plurality of parameters; comparing each of the plurality of parameters to preset limits established for each of said plurality of parameters; and invoking a fault condition when one or more of the plurality of parameters exceed the preset limits established for said one or more of the plurality of parameters. The fault condition may comprise disengaging the energy transducer from a fluid flow until said one or more of the plurality of parameters are equal to or less than the respective preset limits. The plurality of parameters may comprise: a free stream current speed in a column of water; an actual depth of the hydrokinetic device in the column of water; a mooring cable tension; a presence of a marine creature that may create a collision hazard; a passage of a potentially catastrophic weather event; an actual, real-time generator power output level; or a power modulation factor. The energy transducer may comprise a variable control rotor.

The hydrokinetic device may be deployed in an array of hydrokinetic devices, each having an energy transducer. In this case, the method may further comprise: sending an actual generator power output level measurement signal to a station; and receiving an individual power modulation factor from the station. The actual generator power output level may be aggregated at the station with another actual generator power output level received from another one of the hydrokinetic devices in the array of hydrokinetic devices. The individual power modulation factor may be generated based on a target aggregate power output level for all of the hydrokinetic devices in the array of hydrokinetic devices and an actual aggregate power output level for all of the hydrokinetic devices in the array of hydrokinetic devices. The method may further comprise receiving an individual power modulation factor from a station, wherein the depth of the hydrokinetic device is further adjusted based on the individual power modulation factor.

Additional features, advantages, and embodiments of the disclosure may be set forth or apparent from consideration of the following detailed description and drawings. Moreover, it is to be understood that both the foregoing summary of the disclosure, the following detailed description and drawings are exemplary and intended to provide further explanation without limiting the scope of the disclosure.

BRIEF DESCRIPTION OF THE EXHIBITS

The accompanying attachments, including drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the exhibits:

FIG. 2C shows an example of a power control process;

FIG. 2D shows an example of an alternative power control process;

Figure 1A:
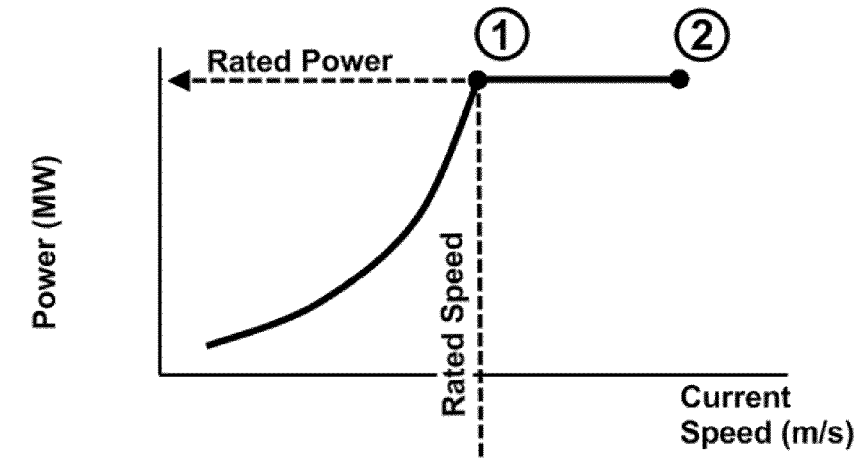
FIG. 1A shows an example of power output by a horizontal axis variable pitch control rotor system.

The present disclosure is further described in the detailed description that follows.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like. Further, the computer may include an electronic device configured to communicate over a communication link. The electronic device may include, for example, but is not limited to, a mobile telephone, a personal data assistant (PDA), a mobile computer, a stationary computer, a smart phone, mobile station, user equipment, or the like.

A "network," as used in this disclosure, means an arrangement of two or more communication links. A network may include, for example, the Internet, a local area network (LAN), a wide area network (WAN), a metropolitan area network (MAN), a personal area network (PAN), a campus area network, a corporate area network, a global area network (GAN), a broadband area network (BAN), any combination of the foregoing, or the like. The network may be configured to communicate data via a wireless and/or a wired communication medium. The network may include any one or more of the following topologies, including, for example, a point-to-point topology, a bus topology, a linear bus topology, a distributed bus topology, a star topology, an extended star topology, a distributed star topology, a ring topology, a mesh topology, a tree topology, or the like.

A "communication link", as used in this disclosure, means a wired, wireless and/or acoustic medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, or the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously. Furthermore, a step may include a process having one or more sub-steps therein.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

According to an aspect of the disclosure, a method, a system and a device are provided for maintaining constant speed and varying depth of operation, thereby providing inter alia, dramatic increases to a capacity factor compared to currently implemented constant depth, variable speed methods that typically shed or relinquish power production at speeds above a rated speed. The capacity factor includes an actual energy output by a hydrokinetic device divided by a maximum theoretical power output by the hydrokinetic device over a given time period.

A hydrokinetic device, when tethered to an upstream mooring cable (or line), experiences both forward and downward force components both of which are directly proportional to the magnitude of a drag force acting on the hydrokinetic device. In particular, the mooring cable experiences tension that includes a vertical force component, referred to as the "drowning force." The drowning force appears as an apparent weight that pulls the hydrokinetic device downward. The sum of the drowning force and the actual weight of the hydrokinetic device must be balanced by the sum of an upward acting buoyancy and a hydrodynamic lift force of the hydrokinetic device in order to remain at a given depth and a free stream current speed. As the free stream current speeds increase, the drowning force increases, thereby pulling the hydrokinetic device downward until the vertical forces again balance at the deeper depth. As free stream current speeds decrease, the drowning force decreases, thereby causing the hydrokinetic device to rise until the vertical forces again balance at the shallower depth. As the angle of the mooring cable with a current flow vector (horizontal axis), referred to as the intercept angle, becomes steeper (larger) or shallower (smaller) when the hydrokinetic device changes depth, and along with other factors to be discussed, the drowning force alters the vertical force balance and the hydrokinetic device may not necessarily return to the depth at which the rated speed occurs ("rated speed depth"). The current flow vector is generally parallel to the water surface (for example, the ocean surface, sea surface, river surface, and the like).

According to an aspect of the disclosure, a hydrokinetic device is provided that recaptures the rated free stream current speed by employing a depth change process (or protocol) as part of a broader power control process (or protocol) in response to changes in a generator power output and/or a free stream current speed, so that the hydrokinetic device remains at the depth at which rated power occurs ("rated power depth") for extended periods of time. By tracking and recapturing a rated power depth, the hydrokinetic devices may increase power production, thereby increasing its capacity factor.

According to a further aspect of the disclosure, a method of operating a hydrokinetic device is provided that may operate the device at free stream current speeds that are less than, for example, the rated speed to intentionally produce a specified partial power output. In this regard, a variable weight effector, a variable lift effector, a variable drag effector, and/or an energy transducer change effector, which may include a rotor blade pitch angle change effector, may be controlled in operating the hydrokinetic device at the free stream current speeds that are less (or more) than, for example, the rated speed to produce, for example, a rated power output, or an intentionally specified partial power output. Other energy transducer change effectors may include, for example, a mechanism to change the capture area of the energy transducer, thereby accepting more (or less) kinetic energy from the moving fluid for conversion into useable electrical energy or power. Changes in energy transducer capture area may also include a variable diameter rotor (for example, variable length rotor blades), a mechanical iris, or flow constrictors located upstream of the energy transducer to divert more (or less) fluid flow into the capture area of the energy transducer or the like. In general, the energy transducer may include any mechanism to vary the degree to which the transducer is engaged with or disengaged from a water current flow, including being in an "off" condition (fully disengaged) or being in an "on" condition (fully engaged).

Additionally, in an ocean current farm composed of many hydrokinetic devices in a regularly (or irregularly) patterned array, the method of operating each of the hydrokinetic devices may be employed to control, modulate or maximize the aggregate power output from the entire array of hydrokinetic devices for various operational advantages. In this regard, the variable weight effector, the variable lift effector, the variable drag effector, and/or an energy transducer change effector, which may include a rotor blade pitch angle change effector, may be controlled by a station (not shown), such as, for example, a THOR HQ controller, located in/on the water (for example, a stationary platform, a vessel, or the like), in/on land (for example, a building structure, a vehicle, or the like), or in the air (for example, an aircraft, a satellite, or the like). Further, the variable weight effector, the variable lift effector, the variable drag effector, and/or an energy transducer change effector, which may include a rotor blade pitch angle change effector, may be autonomously controlled by an onboard main controller (not shown) provided in each hydrokinetic device, or controlled by the onboard main controller in response to a command signal received from the station. The station may be configured to collect the electrical energy from one or more hydrokinetic devices, which may be provided in, for example, an ocean farm array, a sea farm array, a river farm array, or the like. The station may include a utility grid, which may be located on water or land.

In an effort to explain some of the general principles related to the present disclosure, FIG. 1A shows a Power (MW) versus Current Speed (m/s) chart that illustrates an example of the power output by a state of the art pitch regulated horizontal axis rotor hydrokinetic device compared to a given range of current speeds. As seen, as the free stream current speeds increase, the power output by the device increases with the cube of the speed until the rated power is reached at point "1", which occurs at the rated speed. In an effort not to over-torque an onboard generator and risk damage to the generator and power drive train mechanisms, the state of the art pitch regulated horizontal axis rotor devices typically employ a variable pitch control rotor hub that changes the pitch angle of the rotor blades at speeds above the rated speed, thereby shedding and relinquishing power to maintain the generator at the rated power (for example, between points "1" and "2").

As can be appreciated from FIG. 1A, any speed below the rated speed may result in the hydrokinetic device outputting less than its maximum power output; and any speed above the rated speed typically requires a mechanism to shed power, such as, for example, a mechanism that changes a blade pitch angle of a plurality of rotor blades that drive the onboard generator.

By continually operating a hydrokinetic device at the point "1"—for example, corresponding to operation of the device at the rated power and the rated speed in FIG. 1A—a maximum energy conversion and the maximum capacity factor may be achieved and maintained continuously and consistently. The methods disclosed in the present disclosure may achieve this result, for example, by employing a power control process that includes a depth change process to cause changes in operating depth, and hence free stream current speed, to facilitate continual operation of the device at the rated power (or a specified partial power setting) for extended periods of time when the rated speed is present somewhere in a vertical water column where the device is deployed.

The methods of the present disclosure provide additional important advantages, such as, for example: matching a energy transducer capture area and a rated generator power level to reach rated power at a single free stream current speed that occurs most frequently in a vertical water column; reducing the effects of wake losses that are inherent in a farm array of hydrokinetic devices; regaining energy losses that may tend to reduce the electrical generator output of each individual hydrokinetic device; increasing the number of areas that may be used to harvest energy in, for example, the World's ocean currents, including those that may have slower moving waters.

For example, the methods of the present disclosure may match a energy transducer capture area (for example, a rotor swept area) and a rated generator power level to reach rated power at a single free stream current speed that occurs most frequently in the vertical water column. Accordingly, the capacity factor of the generator may be a function of the frequency of occurrence of a selected speed that most frequently occurs. In this regard, the hydrokinetic device may be designed to a single design condition, such as, for example, the single free stream current speed, thus simplifying design and operation requirements.

Figure 1B:
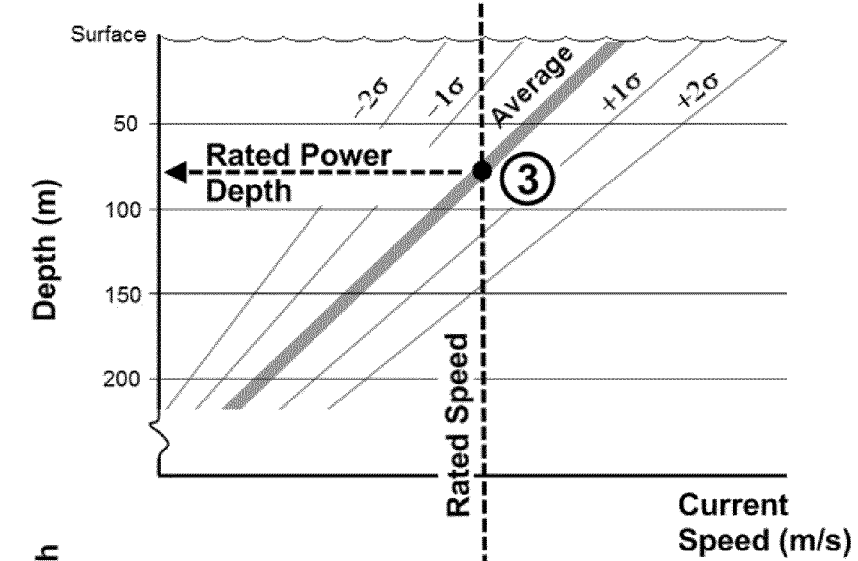
FIG. 1B shows an example of an inverse velocity shear profile of a free stream current velocity of an ocean current.

FIG. 1B shows a chart of an example of Depth (m) versus Current Speed (m/s) in an area of an ocean. The chart is a statistical representation of a compilation of free stream current speed data obtained from an acoustic Doppler current profiler (ADCP) of typical ocean current behavior over a multi-year period. To further illustrate the above point, the average free stream current speed is seen as decreasing monotonically with respect to depth in a linear relationship—this is the previously mentioned "inverse velocity shear". FIG. 1B also shows the bounds of the standard deviation of the free stream current speed as it may change from time to time.

Figure 1C:
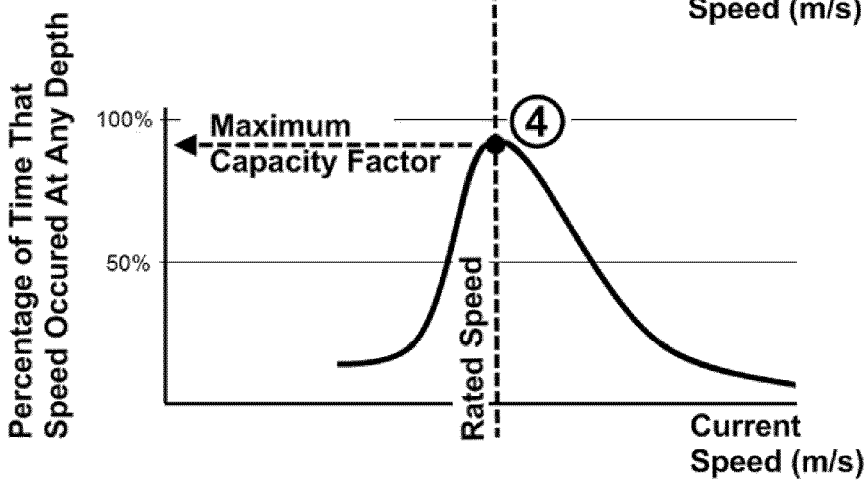
FIG. 1C shows an example of a percentage of time that a free stream current velocity may have occurred at a (some) depth over an extended period of time.

FIG. 1C shows a chart of Percentage of Time That Speed Occurred At Any Depth (%) versus Current Speed (m/s) for typical ocean currents. In FIG. 1C, the ADCP resource data indicates a single maxima at a single free stream current speed that occurs most frequently at any depth in the vertical water column (referred to as the single maxima speed). By selecting the rated speed of the device as that speed corresponding to the single maxima speed in FIG. 1C, then sizing the rotor diameter accordingly to achieve the desired rated power output, and using the power control process, including the depth change process of the present disclosure, the hydrokinetic device may be operated at rated power, as depicted, for example, by point "1" in FIG. 1A, for extended periods of time.

Historical ADCP data may be compiled and used to compute an average rate of ascent (or descent) that may be required by a device employing the methods of the present disclosure in order to, inter alia, recapture the rated power depth (or specified partial power depth) as free stream current speeds fluctuate from time to time. For example, the measured historical data may indicate that approximately 98% of the time, rates of ascent or descent of, for example, less than about 10 feet-per-minute (fpm) may be required to recapture the rated power depth.

Further, the methods of the present disclosure may reduce the effects of any wake losses that are inherent in a farm array of hydrokinetic devices. Wake losses may be inherent in certain arrangements of farm arrays of hydrokinetic devices, where the devices are positioned close enough to each other such that a downstream hydrokinetic device may experience a reduced current speed flow in the wake of an upstream device impinging on the energy transducer capture area of the downstream device. The effects of wake losses may be reduced or eliminated by, for example, operating downstream hydrokinetic devices at a slightly shallower (or deeper) depth and reestablishing the rated speed to produce rated power using the power control process with depth change process of the present disclosure. In fact, using the methods of the present disclosure, downstream hydrokinetic devices may, as a natural consequence, operate at slightly shallower depths than the upstream neighboring device(s). Thus an array of hydrokinetic devices using the methods of the present disclosure may have a stair-stepped depth appearance with each successive downstream row of devices at a slightly shallower depth than the immediate upstream row of devices.

Furthermore, the methods of the present disclosure may regain energy losses that may tend to reduce electrical generator output of each individual hydrokinetic device in, for example a farm array. In this regard, the energy losses that may tend to reduce the electrical generator output of each individual hydrokinetic device may be regained simply by operating each hydrokinetic device at a slightly shallower (or deeper) depth and hence slightly higher free stream current speed to produce rated power output using the power control process of the present disclosure. The energy losses may include, for example, electrical generator efficiency losses inherent in the mechanical design, conversion of kinetic energy of moving water into electrical energy or other such energy losses that may be recoverable by operation at a slightly higher free stream current speed.

The methods of the present disclosure may also increase the number of usable areas in which arrays of hydrokinetic devices may be deployed in, for example, the World's ocean currents, including areas that may have slower moving waters. More of the World's ocean currents, including those that may have slower moving waters, become more feasible for large scale power production using the methods of the present disclosure. Because the relationship between an energy transducer capture area and a rated generator power output level may be optimized to a single maxima speed (for example, as depicted by point 4 in FIG. 1C), new hydrokinetic devices may be fashioned with larger energy transducer capture areas (larger rotor diameters) to produce rated power in much slower moving water currents without having to relinquish power production at higher speeds. Since the present disclosure allows for control of hydrokinetic device energy transducer (for example, rotors) and matched generators without having to cope with free stream speeds above the rated speeds of the generators, larger capture areas associated with an energy transducer, such as, for example, a larger rotor swept area or larger diameter, may be employed to reach rated power at slower free stream current speeds, without having to shed or relinquish power production or employ energy transducer (rotor) "cut-out" to preserve the integrity of the power train mechanisms.

Figures 2A, 2B:
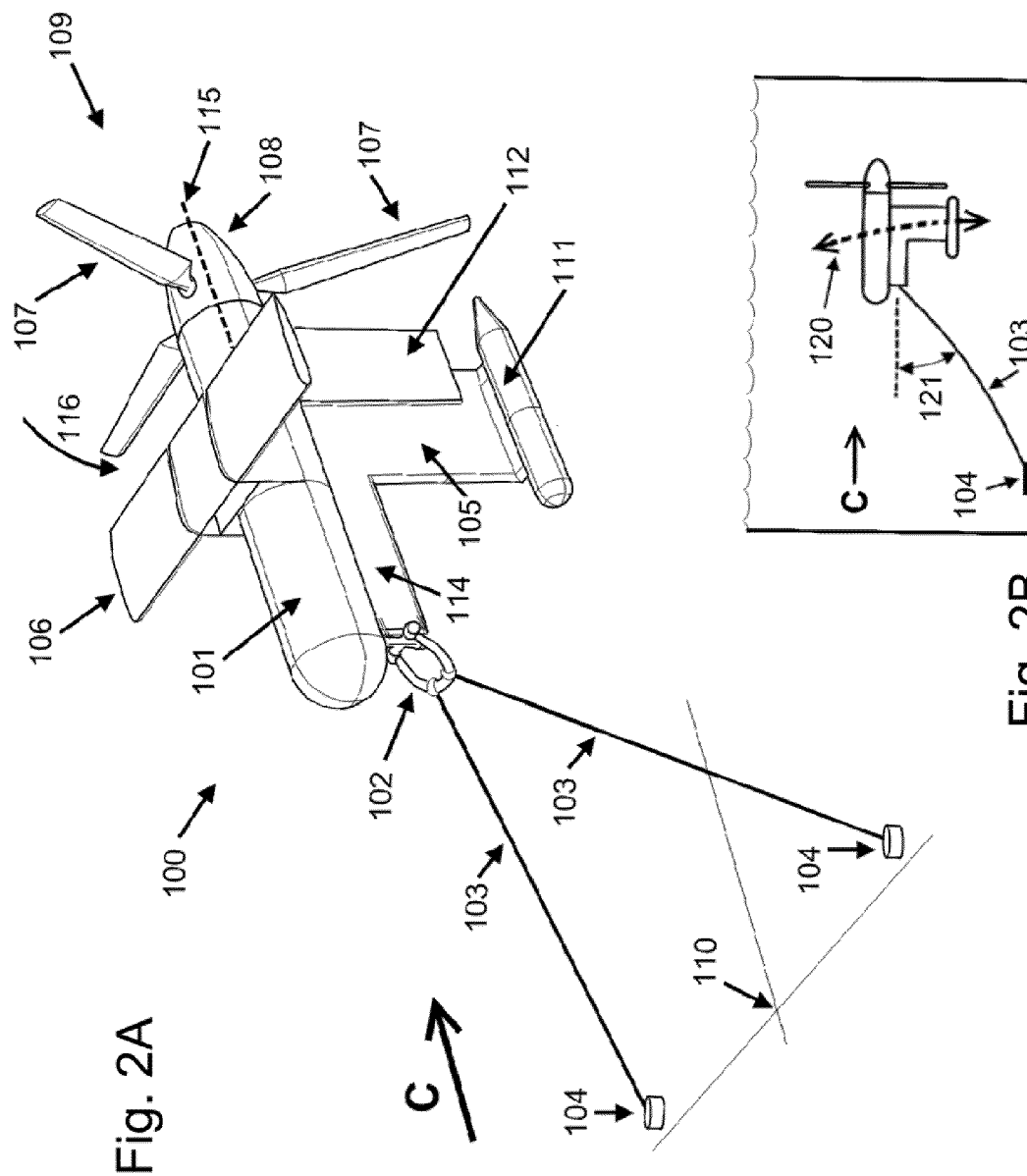
FIGS. 2A and 2B show perspective and side views, respectively, of an example of a hydrokinetic device.

FIGS. 2A and 2B show perspective and side views, respectively, of an example of a hydrokinetic device 100. The hydrokinetic device 100 may have a center of buoyancy ("CB") that is above and upstream of the device's center of gravity ("CG"). The hydrokinetic device 100 includes a hull 101, a rotor 109, and an electrical generator (not shown). The hydrokinetic device 100 may include a keel 105, a keel cylinder 111, a hydrodynamic wing 106, and a harness 102. The hydrokinetic device 100 further includes an onboard main controller (not shown), which includes a computer (not shown). The onboard main controller (for example, "THOR controller") may include a transmitter, receiver, or transceiver (not shown). The hydrokinetic device 100 may include one or more sensors for detecting ambient conditions, such as, for example, water temperature, pressure, depth, proximity of objects (such as, for example, of other hydrokinetic devices, mammals, fish, vessels, and the like), speed and/or direction of water current flow, and the like. Further, the rotor 109 may include an onboard hub controller (not shown) and a transceiver. The hydrokinetic device may include a variable weight effector, a variable lift effector, a variable drag effector, and/or an energy transducer change effector such as, for example, a rotor blade pitch angle change effector.

The variable weight effector may include, for example, one or more interior ballast tanks (not shown) located in the hull 101, which can be alternately flooded or purged with water to adjust the weight, as well as the location of the center of gravity of the hydrokinetic device 100. The hull 101 may provide the main source of buoyancy for the hydrokinetic device 100. Hydrokinetic device 100 may further include the weighted ventral keel 105, which may provide directional alignment and promote yawing of the hydrokinetic device 100 into a free stream current direction. The keel 105 may include a keel cylinder 111 mounted on a distal end of the keel 105, which may contain a counterweight that causes the keel 105 to act as a weighted pendulum to oppose any adverse torque created by the rotor 109.

The variable lift effector may include, for example, the wing 106, which may include an adjustable incidence angle. The wing 106 may include a trailing edge control surface elevator (not shown) with an adjustable deflection angle. The adjustable incidence angle and/or elevator deflection angle may be changed to increase hydrodynamic lift or create down-force.

The variable drag effector may include, for example, split drag flaps 112, which may be attached near a trailing edge of the keel 105. The drag effector may be deployed to produce drag. In the case of split drag flaps, the flaps may be deflected substantially simultaneously outward to present a large frontal area to the current flow for produce drag or retracted inward to decrease the frontal area to reduce drag.

Figure 4:
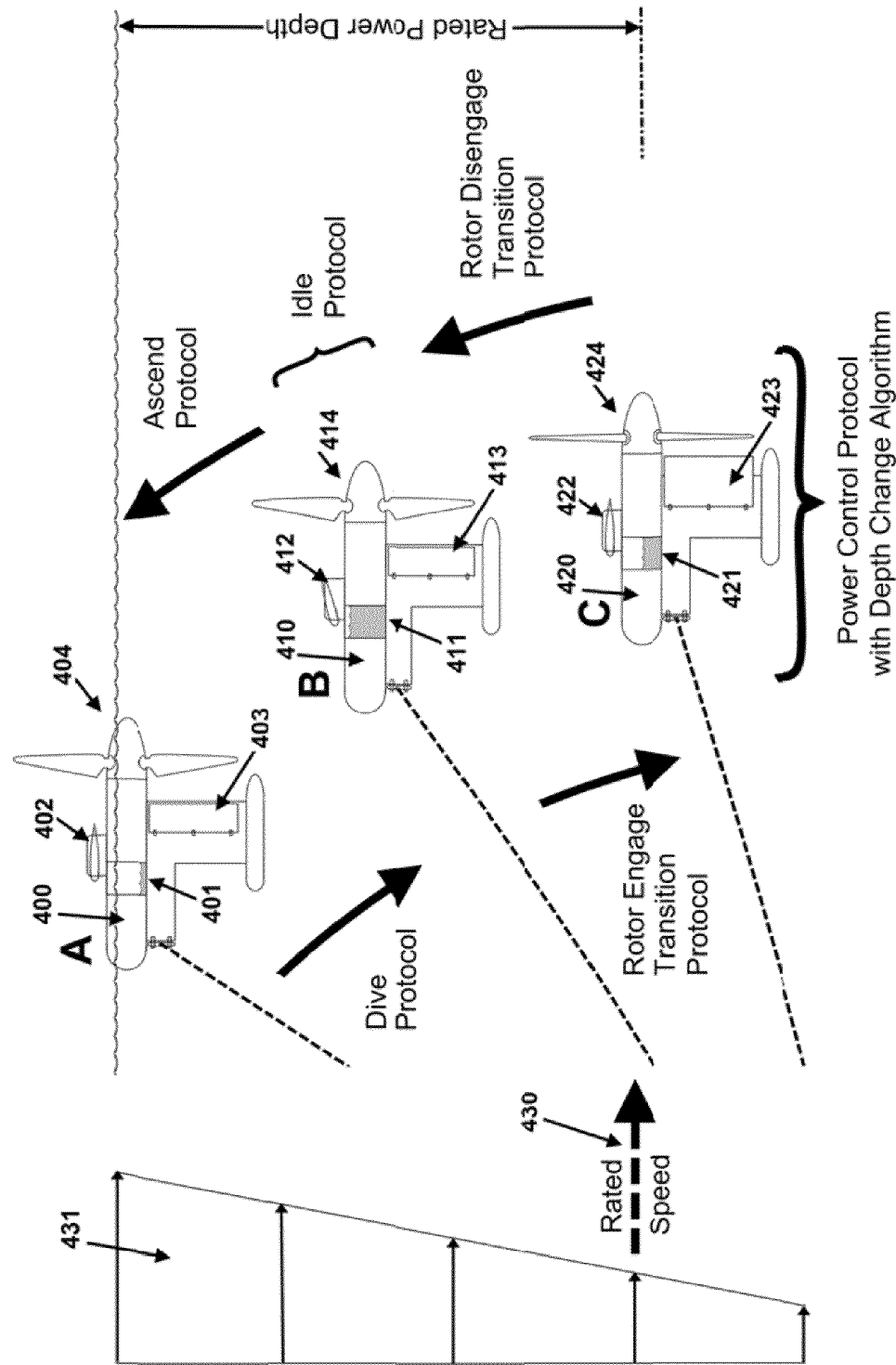
FIG. 4 shows an example of a combined graphic summary of an operation of a tethered hydrokinetic device.

The energy transducer change effector may include, for example, a downstream horizontal axis variable pitch control rotor hub 108 that is coupled to the onboard electrical generator (not shown) to effectuate rotor blade pitch angle changes to a plurality of rotor blades 107 to cause the rotor 109 to be engaged with the current flow in an operational condition (for example, as seen in FIG. 2A) or disengaged from the current flow in a non-operational fully feathered condition (for example, as seen in FIG. 4, state A or state B). Other energy transducer change effectors may include, for example, a mechanism to change a capture area of the energy transducer, thereby accepting more (or less) kinetic energy from the moving fluid for conversion into useable electrical energy or power. Changes in energy transducer capture area may also include a variable diameter rotor (for example, variable length rotor blades), a mechanical iris, or flow constrictors located upstream of the energy transducer to divert more (or less) fluid flow into the capture area of the energy transducer, or the like. The energy transducer may further include a mechanism to engage or disengage with the fluid flow, which may include for example, disengaging form the flow by closing off the entire capture area of the transducer thereby rejecting all incident kinetic energy of the flow or engaging to the flow by opening any previously inactive regions of the capture area.

The harness 102 may include, for example, a universal joint mooring harness that allows the hydrokinetic device 100 to freely pivot in both pitch and yaw while being restrained by attached mooring cables 103 secured, for example, to anchors 104. A pair of perpendicular reference lines 110 show examples of deployment locations for a pair of anchors 104 with regard to a current flow direction C FIG. 2B shows an example of freedom of vertical movement 120 and a mooring line intercept angle 121. The mooring line intercept angle 121 varies with the depth of operation of the hydrokinetic device 100, thereby changing the magnitude of the drowning force at each depth.

The hydrokinetic device 100 is configured to be deployed in patterned deployment arrays or farm arrays. Neighboring hydrokinetic devices 100 deployed in a given farm array may share anchors 104. Electricity created by each onboard generator (not shown) may be routed to, for example, neighboring hydrokinetic devices 100 or one or more stations (not shown) located in the water, or on land, to collect the electrical energy from each hydrokinetic device 100 prior to transmitting the electricity to, for example, a utility grid, which may be located on water or land. The electricity may be transmitted via electrical cables (not shown), which may be attached to, for example, the mooring cables 103 and routed to the neighboring devices 100, or to the one or more stations.

The hydrokinetic device 100 may include, for example, the hydrokinetic device and the method for operating a hydrokinetic device as described in co-pending U.S. patent application Ser. No. 12/789,074, filed on the same date as the instant application, and entitled PITCH, ROLL AND DRAG STABILIZATION OF A TETHERED HYDROKINETIC DEVICE, the entire disclosure of which is hereby incorporated herein by reference for all purposes as if fully set forth herein.

Further, the hydrokinetic device 100 may include a rotor and the method for operating a rotor as described in co-pending U.S. patent application Ser. No. 12/788,945, filed on the same date as the instant application, entitled VARIABLE CONTROL ROTOR HUB WITH SELF-CONTAINED ENERGY STORAGE RESERVOIR, the entire disclosure of which is hereby incorporated herein by reference for all purposes as if fully set forth herein.

The hydrokinetic device 100 may be retained in the water by a mooring system, such as, for example, the mooring system described in co-pending U.S. patent application Ser. No. 12/789,159, filed on the same date as the instant application, and entitled MOORING SYSTEM FOR A TETHERED HYDROKINETIC AND AN ARRAY THEREOF, the entire disclosure of which is hereby incorporated herein by reference for all purposes as if fully set forth herein.

In addition to (or instead of) the above-described examples of mechanisms to alter weight, lift and drag in order to execute the methods of the present disclosure, the hydrokinetic device 100 may be equipped with other mechanisms to effectuate changes in weight, lift and drag, as may be known by those having ordinary skill in the art. Further, an energy transducer may be a variable pitch control rotor hub or another energy conversion device capable of converting the kinetic energy of the moving fluid into useable electrical power that may also have a means to engage to and disengage from the fluid flow.

In operation with a free stream current flowing in the direction C, the hydrokinetic device 100 may employ the variable weight effector, the variable lift effector, the variable drag effector, and/or the energy transducer change effector previously described to alter weight, lift and drag in order to execute the methods of the present disclosure to remain at a rated power depth for extended periods of time. As previously noted, the energy transducer change effector may include a rotor blade pitch angle change effector. The rated power depth for the hydrokinetic device 100 may change from time to time as the free stream current conditions change, or as water density may change with temperature and/or salinity. The hydrokinetic device 100 may be configured to track and recapture the rated power depth using a power control process, including a depth change process, as described, for example, with reference to FIG. 7. The onboard main controller (for example, THOR controller) employs the power control process, including the depth change process, to exert active control authority over the depth at which operations occur by controlling a magnitude of the weight, lift and/or drag of the hydrokinetic device 100.

FIG. 2C shows an example of a power control process 350 that may be carried out, for example, by the onboard main controller, an onboard main controller in another hydrokinetic device, or a computer located at the station (for example, "THOR HQ" controller), to maintain the hydrokinetic device 100 at a predetermined power output level. Initially, a target generator power output level is set for the particular hydrokinetic device 100 (Step 352). The power output by the onboard generator (not shown) is monitored to continuously (or intermittently) detect the real-time (or a weighted average) power output level of the generator (Step 354). A determination is made whether the detected power output level is greater than, less than, or equal to the target power output level (Step 356).

Alternatively, a target generator power output level range may be set (Step 352) and the detected real-time power output level (Step 354) may be compared to the target power output level range to determine whether the detected power output level is greater than, less than, or equal to the target power output level range (Step 356).

If a determination is made that the real-time power output level is not equal to the target power output level (or range) (NO at Step 356), then the depth change process may be invoked to maintain the hydrokinetic device 100 at the target generator power output level (Step 358), otherwise monitoring of the real-time power output level continues (YES at Step 356, then Step 352).

FIG. 2D shows an example of an alternative power control process 360 that may be carried out, for example, by the onboard main controller, an onboard main controller in another hydrokinetic device, or a computer located at the station (for example, the THOR controller), to maintain the hydrokinetic device 100 at a predetermined power output level. Initially, a target free stream current speed may be set for a particular area in which the hydrokinetic device 100 is to be (or has been) deployed (Step 362). The free stream current speed may be monitored to continuously (or intermittently) detect a substantially real-time (or weighted average) free stream current speed experienced by the hydrokinetic device (Step 364). A determination is made whether the detected real-time free stream current speed is greater than, less than, or equal to the target free stream current speed (Step 366).

Alternatively, a target free stream current speed range may be set (Step 362) and the detected real-time (or weighted average) free stream current speed (Step 364) may be compared to the target free stream current speed range to determine whether the detected free stream current speed is greater than, less than, or equal to the target free stream current speed range (Step 366).

If a determination is made that the real-time free stream current speed is not equal to the target free stream current speed (or range) (NO at Step 366), then the depth change process may be invoked to maintain the hydrokinetic device 100 at the target free stream current speed (Step 368), otherwise monitoring of the real-time free stream current speed continues (YES at Step 366, then Step 362).

Other methods may be employed by the THOR controller to effect the operations of the hydrokinetic device 100, including, for example, dive, ascend, idle and rotor engage and rotor disengage transition processes (or protocols). These methods are in addition to the power control process with depth change process. These other methods may be employed to provide operational advantages as will become apparent to those having ordinary skill in the art from the description provided herein.

As noted earlier, the hydrokinetic device 100, when tethered to the upstream mooring cables (or lines) 103, experiences both forward and downward force components. The following equation [1] provides an example of a relationship for a vertical force trim. In particular, equation [1] provides an example of a relationship between various forces acting on the hydrokinetic device 100 that should be balanced to maintain the device 100 at particular location in a vertical water column:

$$B+L=W+(\tfrac{1}{2}\rho V^2)(C_T)(A_{rotor})(\mathrm{Tan}(a)) \quad [1]$$

The following equation [2] expresses a relationship between energy (or power) production and moving fluids:

$$P=(\tfrac{1}{2}\rho V^3)(C_p)(A_{rotor}) \quad [2]$$

where:
B=Buoyant Lift Force
L=Hydrodynamic Lifting Force

W=Weight of hydrokinetic device
ρ=Density of Sea Water
V=Free Stream Current Velocity
$C_T$=Rotor Drag Coefficient
$C_P$=Rotor Power Coefficient
$A_{rotor}$=Swept Area of the Rotor
Tan(a)=Tangent of the mooring line intercept angle
P=Power output As evident from the above equation [1], a simple vertical force balance for the hydrokinetic device 100 may be attainable as the hydrokinetic device 100 is lifted upwards in the vertical water column by buoyancy ("B") that may be created by the displacement of fluid and lift ("L") that may be created by the wing and pulled downward by the sum of its weight ("W") and the drowning force, with the drowning force expanded into its constituent terms and for the sake of illustration, includes only the contribution of the operational rotor to the drowning force.

By inspecting equation [1], it should be evident that for a given free stream current speed ("original speed"), sea water density and mooring line intercept angle, and taking other variables as constants, by adjusting weight and hydrodynamic lift, the hydrokinetic device 100 may remain in vertical force balance at a constant depth at the original speed. Then, an increase in free stream current speed may cause the drowning force on the right hand side of equation [1] to increase, and the hydrokinetic device 100 may descend and be pulled further downward by the drowning force and settle at a new depth at which the left hand and right hand sides of equation [1] are equal. However, the free stream current may have a higher speed at the new depth than it previously had at the original depth, since the mooring line intercept angle decreased among other factors. Such a decrease in the mooring line intercept angle may be considerable given that a depth change of, for example, about 100 meters may occur in an overall depth of about 350 meters. Thus, to return the hydrokinetic device 100 to the original free stream current speed, it may be necessary to increase the weight of the hydrokinetic device 100 and to decrease the lift, including the hydrodynamic down-force as necessary, so that the hydrokinetic device 100 may descend further to recapture the original free stream current speed and cease vertical movement at the deeper depth.

Conversely, a similar series of events may occur for a decrease in the free stream current speed from the original speed, but the hydrokinetic device 100 will likely rise instead. Thus, to return the hydrokinetic device 100 to the original speed, it may be necessary to decrease the weight of the hydrokinetic device 100 and increase the lift of the hydrokinetic device 100, so that the hydrokinetic device 100 may ascend further to recapture the original speed and cease vertical movement at the shallower depth. Since the generator power output level may be the most desirable parameter to control on the hydrokinetic device 100, and the power output level is directly proportional to the free stream current speed as well as, for example, sea water density, it may be more advantageous to adjust the depth to recapture the rated power depth rather than the rated speed depth.

Further, equation [2] expresses the relationship between energy production and moving fluids from a horizontal axis type rotor. As noted earlier, a free stream current speed that is less than the rated speed may cause the hydrokinetic device 100 to output less than its rated power output. Along with the inverse velocity shear profile, as previously discussed, free stream current speeds less than the rated speed occur at depths deeper than the rated power depth. Therefore, active depth control at depths deeper than the rated power depth may provide power modulation and power output control, another important aspect of the present disclosure.

Figure 3A:
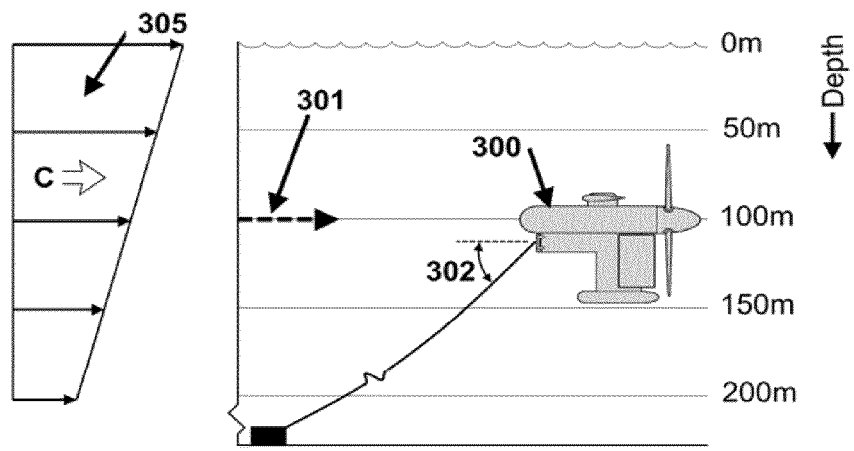
FIG. 3A shows an example of a tethered hydrokinetic device of FIG. 2C operating at a rated speed in an ocean current that is moving at an average speed.
Figure 3B:
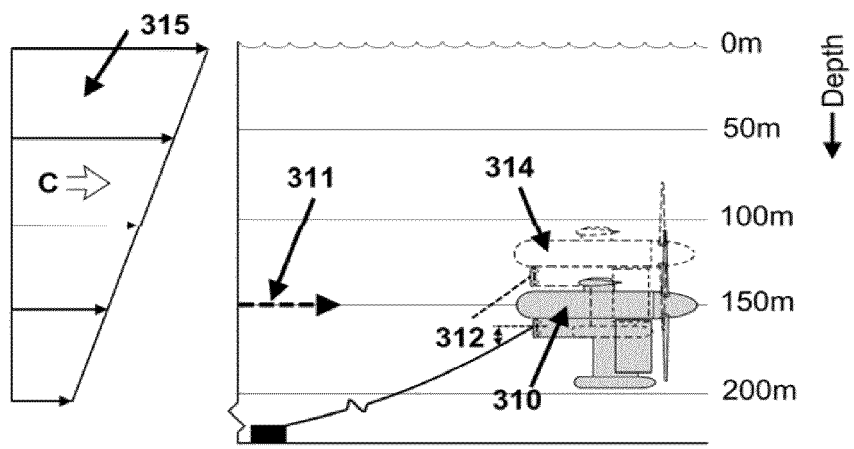
FIG. 3B shows an example of the tethered hydrokinetic device of FIG. 2C operating at a rated speed in a ocean current moving at a speed greater than the average speed.
Figure 3C:
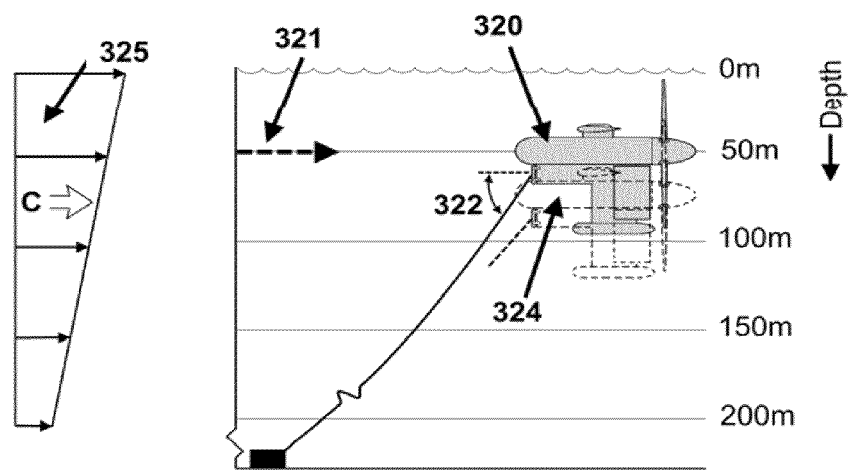
FIG. 3C shows an example of the tethered hydrokinetic device of FIG. 2C operating at a rated speed in an ocean current moving at a speed slower speed than the average speed.

FIGS. 3A-3C show various examples of operation of a tethered hydrokinetic device 100, according to principles of the disclosure. In particular, FIG. 3A shows an example of the tethered hydrokinetic device 100 operating at a rated speed in an ocean current that is moving at an average speed; FIG. 3B shows an example of the tethered hydrokinetic device 100 operating at the rated speed in a ocean current moving at a speed greater than the average speed; and FIG. 3C shows an example of the tethered hydrokinetic device 100 operating at the rated speed in an ocean current moving at a speed slower speed than the average speed.

Referring to FIG. 3A, the hydrokinetic device 100 is attached to an upstream mooring cable and operating in an average speed inverse velocity shear free stream current condition 305. In this case, the hydrokinetic device 100 is operating at its rated power at a position 300 at which the rated speed 301 occurs, for example, approximately 100 meters as shown in FIG. 3A. The upstream mooring cable (or line) forms an intercept angle 302 with the horizontal component of the current flow vector C (or horizontal axis). In the example shown in FIG. 3A, the hydrokinetic device 100 is stationary in the vertical plane with balanced vertical forces.

Referring to FIG. 3B, as the free stream current speed increases to a faster condition, the hydrokinetic device 100 passively descends to a position 314 at a depth of about 125 meters, thereby causing a decrease in the intercept angle 302 to a new angle 312 and lessening the apparent weight presented by the drowning force. In order to recapture the rated speed and/or the rated power depth denoted by the arrow 311, which now occurs at a depth of about 150 meters, the hydrokinetic device 100 needs to adjust the operating depth and take on ballast and/or increase down force on the wing, or reduce the amount of lift carried by the wing, to descend an additional 25 meters to a position 310 at which the rated speed 311 occurs.

Since the generator output power is the primary control variable and because water temperature or salinity, and hence water density may have changed during the depth change adjustment, along with other reasons previously discussed, it may be advantageous to use the generator power output as the primary feedback variable in the execution of the power control process. The process of recapturing the rated power output or an intentional partial power output, which is less than the rated power output, by the hydrokinetic device 100 may be carried out using, for example, the power control process 350 (shown in FIG. 2C).

Alternately, the free stream current speed may also be a primary or a secondary feedback variable in the execution of the power control process. In this regard, the process of recapturing the rated power output or an intentional partial power output by the hydrokinetic device 100 may be carried out using the power control process 360 (shown in FIG. 2D). The target free stream current speed may be the rated speed or a target free stream current speed less than the rated speed for intentional partial power output. It may also be advantageous to use a combination of both speed and power as the feedback variables in the power control process with depth change algorithm.

Referring to FIG. 3C, conversely, as the free stream current speed decreases to a slower condition, the hydrokinetic device 100 may passively ascend to a position 324 at a depth of about 75 meters, causing an increase in the intercept angle to a new angle 322 and increasing the apparent weight presented by the drowning force. In order to recapture the rated speed depth and/or rated power depth denoted by the arrow 321, which now occurs at a depth of about 50 meters, the hydrokinetic device 100 may need to adjust the operating depth and, for example, offload ballast and/or increase lift on the wing, or reduce the amount of down force carried by the wing, to ascend an additional 25 meters to a position 320 at which the rated speed 321 occurs.

Since the generator output power is the primary control variable and because water temperature or salinity, and hence water density may have changed during the depth change adjustment along with other reasons previously discussed, it may be advantageous to use the generator power output as the primary feedback variable in the execution of the power control process. The method of recapturing the rated power output or an intentional partial power output by the hydrokinetic device 100 may be carried out using the power control process 350 (shown in FIG. 2C).

Alternately, the free stream current speed may also be the primary or a secondary feedback variable in the execution of the power control process. In this regard, the process of recapturing the rated power output or an intentional partial power output by the hydrokinetic device 100 may be carried out using the power control process 360 (shown in FIG. 2D). The target free stream current speed may be the rated speed or a target free stream current speed below the rated speed for intentional partial power output. It may also be advantageous to use a combination of both speed and power as the feedback variables in the power control process with depth change algorithm.

FIG. 4 shows an example of a combined graphic summary of an operation of a tethered hydrokinetic device 100, according to principles of the disclosure. In particular, FIG. 4 shows an inverse velocity shear profile free stream current condition 431 flowing from left to right and various states (for example states A, B, and C) of operation of the hydrokinetic device 100, as well as the transition methods between each state. In general, the THOR controller associated with the hydrokinetic device 100 may effectuate changes in weight, lift and drag as previously described to position the hydrokinetic device 100 in each state, as well as to transition the hydrokinetic device 100 between states. Further, anytime the energy transducer is engaged with the flow, for example rotor 109 is in the engaged position with the rotor blades pitched to the operational condition with hub 108 rotation in motion, the drag flaps 112 may be fully retracted in a low drag or no drag condition; and, anytime the energy transducer is disengaged with the flow, for example rotor 109 is in the non-operational disengaged position with the rotor blades pitched to a fully feathered condition and hub 108 rotation may be halted, the drag flaps 112 may be partially deployed for less than high drag condition, or fully deployed for a high drag condition.

In a state A, the hydrokinetic device 100 is in a semi-submerged condition 400 with ballast tanks in a low fill, low weight condition 401 and the wing 106 is above the water surface in a substantially zero incidence position 402. The drag flaps 112 are partially deployed to a condition 403, and the rotor 109 is disengaged from the current flow and held in a non-operational condition 404. In this state (A), the hydrokinetic device 100 may be serviced from a surface vessel or may be idle in a very low speed current event. In order to prevent a collision hazard, rapid surge forward in position or cable entanglement risk with neighboring hydrokinetic devices in, for example, an ocean current farm array, the drag flaps 112 may be partially deployed to the condition 403 to tension the mooring cables. However, the drag flaps 112 should not be deployed to a high drag condition that may cause the hydrokinetic device 100 to descend below the water surface.

To move from the state A to a state B, a dive process (or protocol) 900 (shown in FIG. 9) may be invoked and the drag flaps 112 may be deployed to, for example, a fully deployed position 413 to increase the drowning force and pull the hydrokinetic device 100 below the surface to a position 410. The ballast tanks may fill with water to a fill condition 411 and the wing 106 may be deflected (or adjusted) to a position 412 having negative incidence angles once below the surface, thereby creating an additional down-force, causing further descent by hydrokinetic device 100 whilst the rotor 109 remains in a disengaged condition 414. While the rotor remains disengaged from the current flow, the sum of the down-force created by the wing 106, the additional weight taken in by the ballast tanks and the increase in drowning force created by the presence of the higher drag force from the deployed drag flaps 112 may cause the hydrokinetic device 100 to descend further. The dive reaches successful completion at state B at, or slightly above the depth at which the rated speed 430 occurs.

To move from the state B to a state C, a rotor (energy transducer) engage transition process (or protocol) 1100 (shown in FIG. 11) may be invoked. In the rotor engage transition process, the rotor 109 is transitioned from the disengaged condition 414 to an engaged condition 424, which dramatically increases drag as the rotor blades approach operational pitch angles and hence the drowning force progressively increases. As the drag and drowning forces are increased and the rotor 109 enters operation 424, the drag flaps 112 may be progressively retracted to a zero drag condition 423, the wing 106 may be progressively inclined to a no load condition 422 and the ballast from ballast tanks may be offloaded to a condition 421 at a rate at which the rotor engage transition process occurs at constant depth or constant free stream current speed, both of which require a seamless net sum zero transition of vertical forces. The rotor engage transition process is complete when the rotor 109 is rotating with blades completely engaged with the current flow and the drag flaps 112 are completely retracted. In the newly acquired position 420, the hydrokinetic device 100 may be operational and producing power at state C with output at or near rated power.

At state C, the power control process 350 (shown in FIG. 2C, or 360 shown in FIG. 2D, or 800 shown in FIG. 8), including the depth change process, may be invoked and the hydrokinetic device 100 may adjust its operating depth in response to the changing free stream current conditions with the aid of the wing and ballast tanks to continually track and recapture the rated power depth. The drag inducer 112 may be maintained in the fully retracted condition 423 while the rotor 109 remains in operation.

Alternately, in, for example, an ocean farm array, a power modulation factor may be assigned to each hydrokinetic device 100 within the ocean farm array, where the power modulation factor represents a percentage of the rated power output by each hydrokinetic device 100. If so assigned, and the power modulation factor is less than about 100%, the hydrokinetic device 100 may track and recapture the depth at which the specified partial power setting is achieved by the generator ("specified partial power depth"). Intentional partial power operation using the assigned power modulation factor may provide power control and/or modulation from the entire ocean current farm array, or from less than all of the hydrokinetic devices 100 in the farm array.

Operations during the power control process may be terminated unintentionally during very high speed current events that may tend to coerce the hydrokinetic device 100 to depths below, for example, a maximum structural crushing depth, or in very low speed current events that would tend to bring the hydrodynamic device 100 to shallow depths that may cause, for example, the rotor blade tips to excessively cavitate or even pierce and extend above the water surface. If unintentionally terminated by such very high or very low speed current events, the hydrokinetic device 100 may invoke the ascend process (or protocol) 1000 (shown in FIG. 10) or the idle process (or protocol) 1300 (shown in FIG. 13), after completion of the rotor disengage transition process, to rise to the surface or to an interim depth at which it may remain idle. During the idle process (or protocol), the hydrokinetic device 100 may employ an acoustic Doppler current profiler (ADCP) query process (or protocol) to probe a vertical water column for the return of a rated speed. In either case, the hydrokinetic device 100 may wait out the passage of the anomalous environmental event before diving, engaging, or further operation using the power control process.

To move from the state C to the state B, a rotor (energy transducer) disengage transition process (or protocol) 1200 (shown in FIG. 12) may be invoked in a similar, but reverse manner as the rotor engage transition process. In the rotor disengage transition process, the rotor 109 is transitioned from the engaged operational condition 424 to the disengaged non-operational condition 414, which may dramatically decrease drag as the rotor blade pitch angles approach the non-operational fully feathered condition 404 and hence the drag force and the drowning force may be progressively withdrawn. As the rotor 109 disengages from the current flow, the drag and drowning forces are decreased and the drag flaps 112 may be deployed progressively, extending from the fully retracted condition 423 to the high drag condition 413. Further, the wing 106 may be progressively inclined from the no load condition 422 to the negative incidence angles condition 412 to create a down-force. Still further, the ballast in the ballast tanks may be increased from a partial fill condition 421 to a fill condition 411 at a rate at which the rotor disengage transition process occurs at constant depth or constant free stream current speed, both of which require a seamless net sum zero transition of vertical forces. The rotor disengage transition process may be complete when the rotor 109 is halted with the blades fully feathered in the non-operational condition 414, and the drag flaps 112 are deployed to the high drag condition 413. The hydrokinetic device 100 remains idle with no power production and is maintained at a position 410 by the control authority of the weight, lift and drag effectors implemented by, for example, the ballast tanks, the wing 106 and the drag flaps 112, respectively.

To remain at the state B, the idle process (or protocol) may be invoked and executed. In the idle process, the hydrokinetic device 100 may remain at a specified depth 410 or at a variable depth corresponding to a specified free stream current speed under the control authority of the weight, lift and drag effectors described above, with the rotor 109 in the disengaged condition 414 and no power production from the generator. The idle process may be invoked for a variety of reasons, including, for example, the passage of catastrophic weather events (for example, hurricanes, typhoons, cyclones, tsunamis, or the like), ensuring device survival, during the passage of endangered marine mammals, ensuring collision avoidance, or the like. The idle process may also be invoked when the assigned power modulation factor for a specific hydrokinetic device 100 within an ocean current farm array is set to zero. During the execution of the idle process, the ADCP query protocol may periodically be invoked to probe the vertical water column for the existence of the rated speed, among other purposes.

To move from the state B to the A, where the state A may be on the surface or another specified depth, the ascend process (or protocol) may be invoked and, under the control authority of the variable weight effector, the variable lift effector, the variable drag effector, and/or the energy transducer change effector (such as, for example a rotor blade pitch angle change effector), the hydrokinetic device 100 may ascend to the surface or some other specified depth. For example, the ballast from ballast tanks may be offloaded, thereby reducing the weight of the hydrokinetic device 100. Further, the wing 106 may be deflected to angles having positive values, thereby creating more lift. The drag flaps 112 may be retracted slightly to reduce drag, thereby lessening the apparent weight attributable to the drowning force, thereby causing the hydrokinetic device 100 to ascend whilst the rotor 109 remains in the disengaged and non-operational condition 414. The ascend process may reach successful completion when the hydrokinetic device 100 reaches the surface or a specified depth.

Any time prior to or during the execution of the power control process (for example, processes 350 or 360 shown in FIG. 3A or 3B) that requires a change in depth, it may be advantageous to use an onboard ADCP to query the vertical water column by pinging both above and below the hydrokinetic device 100. The information returned by the query may be assimilated by the THOR controller for higher level predictive and/or corrective control.

The ascend, descend and idle processes may be accomplished with the rotor 109 disengaged. Rotor engagement or disengagement may occur via the rotor engage transition process or the rotor disengage transition process, respectively. Depth control during ascend, descend and idle operating conditions may be accomplished under the control authority of the variable weight effector, the variable lift effector, the variable drag effector, and/or the energy transducer change effector (such as, for example, a rotor blade pitch angle change effector). Rotor 109 operation and power production occur during execution of the power control process, which comprises the depth change process that enables the hydrokinetic device 100 to track and recapture the rated power depth, or track a specified partial power depth. The power control process may be terminated unintentionally by either very high speed or very low speed current events, for example, where the maximum crushing depth or a minimum near surface depth may be exceeded. The power control process may be intentionally terminated and the idle process invoked, for example, to allow the passage of extreme weather events, passage of endangered species, or other such events. ADCP queries may be used for higher level predictive and/or corrective control.

Figure 5:
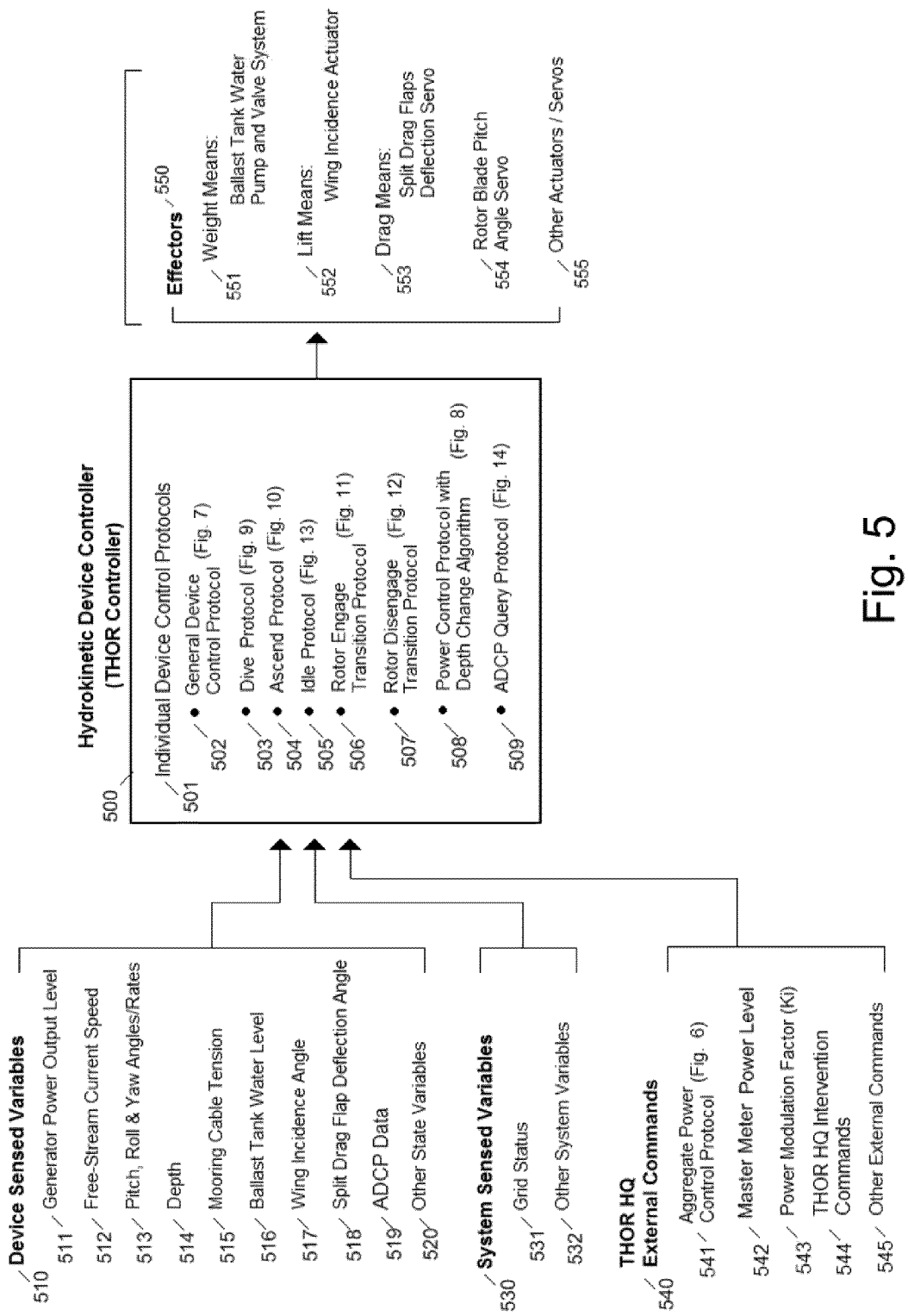
FIG. 5 shows an example of a parametric representation of a THOR controller.

FIG. 5 shows an example of a parametric representation of a THOR controller 500, according to principles of the disclosure. As noted earlier, the THOR controller may be provided onboard the hydrokinetic device 100, as well each hydrokinetic device 100 provided in, for example, an ocean current farm array. The THOR controller 500 comprises a variety of input parameters, including, for example, device sensed parameters 510 and system sensed parameters 530. The THOR controller 500 may also receive external or intervening commands 540 from the station (for example, a central command and control facility THOR HQ).

The THOR controller 500 comprises a computer (not shown) that is capable of accepting the sensed parameters and commands 540, then executing the methods of the present disclosure with the values of the sensed parameters 510, 520, and the commands 540, to then effectuate changes in a plurality of effectors 550, which may include, for example, the variable weight effector 551, the variable lift effector 552, the variable drag effector 553, the energy transducer change effector such as a rotor blade pitch angle change effector 554, and/or other effectors 555, in such a manner and magnitude that the hydrokinetic device 100 operates as prescribed by the methods of the present disclosure. Further, based on the movement and operation of the hydrokinetic device 100 in response to changes in the effectors 550, new values for the device sensed parameters 510 may be presented to the THOR controller 500 and additional changes to effectors 550 may be commanded by the THOR controller 500 to further compel operational compliance of the hydrokinetic device 100 with the methods of the present disclosure.

A few examples of the device sensed parameters 510, which may be acquired via sensors resident on the hydrokinetic device 100, are listed in FIG. 5, including, for example, a generator power output level parameter 511, a free stream current speed parameter 512, a pitch, roll and yaw angles and rates parameter 513, a depth parameter 514, a mooring cable tension force parameter 515, a ballast tank water level parameter 516, a wing incidence angle parameter 517, a split drag flap deflection angle parameter 518, an ADCP data parameter 519, and other device sensed parameters 520.

A few examples of the system sensed parameters 530, which may be acquired via sensors located remote to the hydrokinetic device 100, are listed in FIG. 5, including, for example, a electrical grid status parameter 531, and other system sensed parameters 532. The system sensed parameters 530 may be received from, for example, the station, which may be continuously aware of the overall status of an ocean current farm array. The THOR HQ 540 may be connected via a communication link to the onboard main controller of each hydrokinetic device 100 in the ocean current farm array. The station (for example, the THOR HQ 540) may issue external commands to any or all of the hydrokinetic devices 100 in the array. The external commands may include, for example, a power control modulation factor 543, an intervention command 544, and/or other external commands 545. The external commands 540 may also be issued by service vessels to one or more hydrokinetic devices 100. Additionally, the THOR HQ 540 may execute an aggregate power control protocol 541 that may modulate and set a target aggregate power output level for the entire ocean current farm array. The THOR HQ 540 may monitor master meter 542 indications, which may measure the aggregate power output level from the sum of all of the hydrokinetic devices 100 in the ocean farm array, to administer the aggregate power control protocol 541.

The THOR controller 500 may execute an individual device control process (or protocol) 501, which may have constituent processes, including, for example, a general device control process (or protocol) 502, a dive process (or protocol) 503, an ascend process (or protocol) 504, an idle process (or protocol) 505, a rotor engage transition process (or protocol) 506, a rotor disengage transition process (or protocol) 507, a power control process (or protocol) with depth change process 508, and the ADCP query process (or protocol) 509. Various effectors are employed from the plurality of effectors 550 to effect and change the operational behavior of each hydrokinetic device 100 to comply with the aforementioned processes. While examples of effectors 550 have been disclosed herein, including, for example, purging and filling ballast tanks for variable weight adjustment, changing the incidence angle of a hydrodynamic wing for variable lift adjustment and deflecting split drag flaps simultaneously outward for variable drag adjustment, any mechanism that may effectuate weight, lift and drag may be employed to carry out the operations of each hydrokinetic device 100 according to the methods of the present disclosure, without departing from the scope or spirit of the disclosure.

Figure 6:
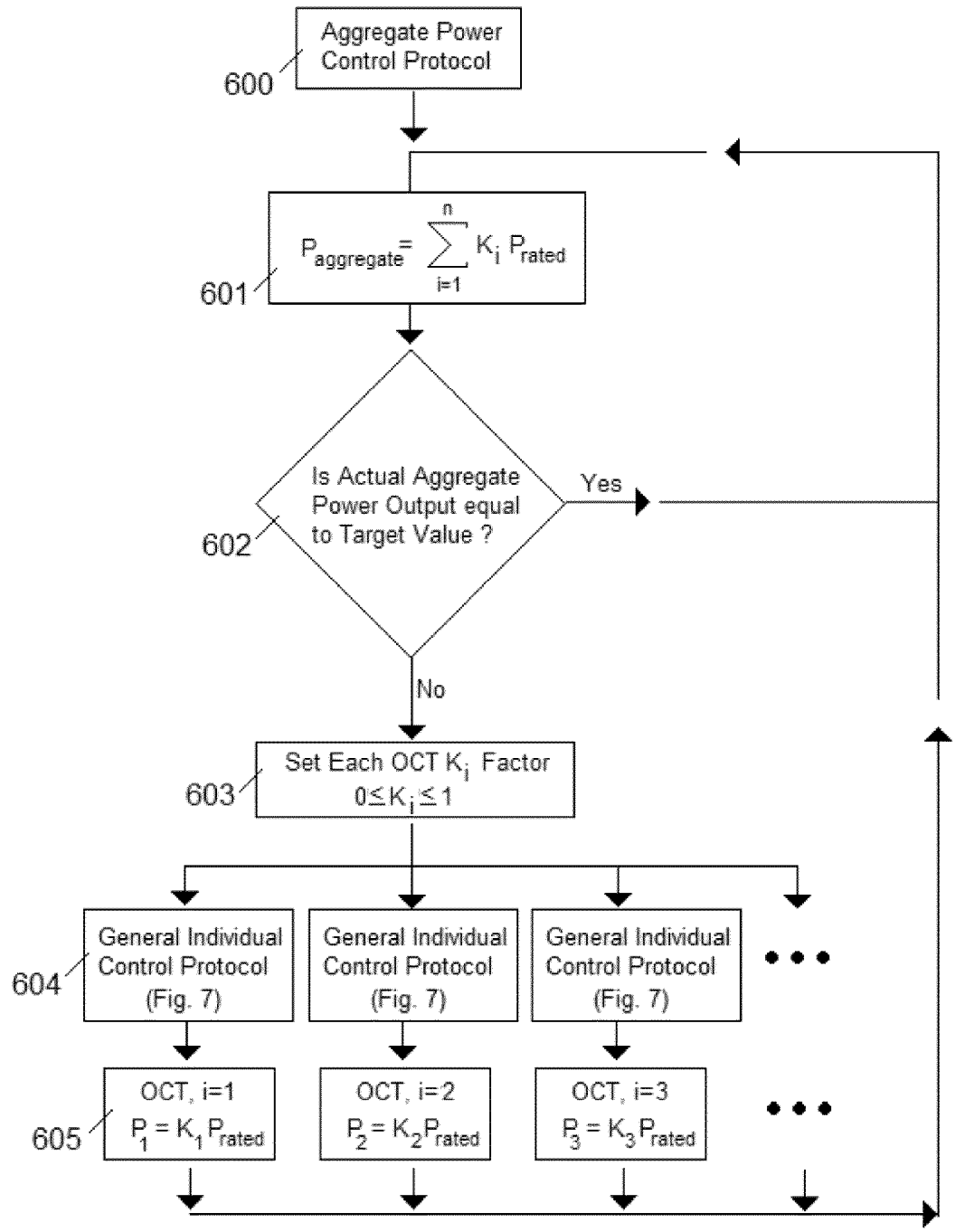
FIG. 6 shows an example of a process for controlling an aggregate power output for an ocean current farm array.

FIG. 6 shows an example of an aggregate power control process 600 for controlling an aggregate power output for an ocean current farm array, according to principles of the disclosure. The aggregate power control process 600 may be administrated, for example, by the THOR HQ from a remote location. The THOR HQ may specify the target aggregate power output level for the entire farm array of hydrokinetic devices, or a subset thereof, such as, for example one or more individual hydrokinetic devices. The target aggregate power output level may be changed from time to time to achieve various operational advantages.

In general, a target aggregate power output level may be set for the entire ocean current farm array. A power modulation factor (Ki), which has a value between 0 and 1 inclusive, may be assigned separately to each hydrokinetic device 100 in the array. Each hydrokinetic device 100 may use the methods of the present disclosure, including the power control process, to generate electrical power in the amount equal to the product of the assigned power modulation factor, Ki, and the rated power output level of each hydrokinetic device 100. As free stream current conditions change from time to time, which may change the aggregate power output level of the entire array, each hydrokinetic device 100 may readjust itself based on the methods of the present disclosure to generate the assigned power output level, thereby causing the actual aggregate power output level of the entire ocean current farm array to equal the target aggregate power output level. This process may be repeated so that actual and target values remain equal or within an acceptable margin.

Referring to FIG. 6, initially the power output level of each hydrokinetic device in the array is summed to determine an actual power output level $P_{aggregate}$ (Step 601). The actual aggregate power output level $P_{aggregate}$, along with the system level information provided by a master meter output level, as described with reference to FIG. 5, may be compared to the target aggregate power level (Step 602). If the actual power output level $P_{aggregate}$ is equal to the target value (YES at Step 602), then no action is taken and Step 601 is repeated. If the actual aggregate power output level $P_{aggregate}$ and target values are not equal (NO at Step 602), then a power modulation factor, Ki, is assigned or reassigned to each hydrokinetic device 100 in the array and the power modulation factor, Ki, is transmitted from the THOR HQ to the THOR controller 500 associated with each hydrokinetic device 100 over a communication link (not shown) (Step 603).

Each THOR Controller may initiate a general individual control process 700 (for example, shown in FIG. 7) to cause the power output level of the respective hydrokinetic device to equal the product of the assigned power modulation factor, Ki, and the rated power of each device (Steps 604 and 605). The process 600 is repeated and Step 601 may be executed again. In some instances, as the free stream current conditions are in the process of changing, the actual aggregate power output level may fluctuate as individual hydrokinetic devices readjust to the new free stream current conditions. Higher order algorithms, including various lead/lag, predictive/corrective or other well known control techniques may be added to the aggregate power control protocol described in FIG. 6 to cause more rapid convergence of the actual aggregate power output level and the target aggregate power output level without departing from the scope or spirit of the disclosure.

Figure 7:
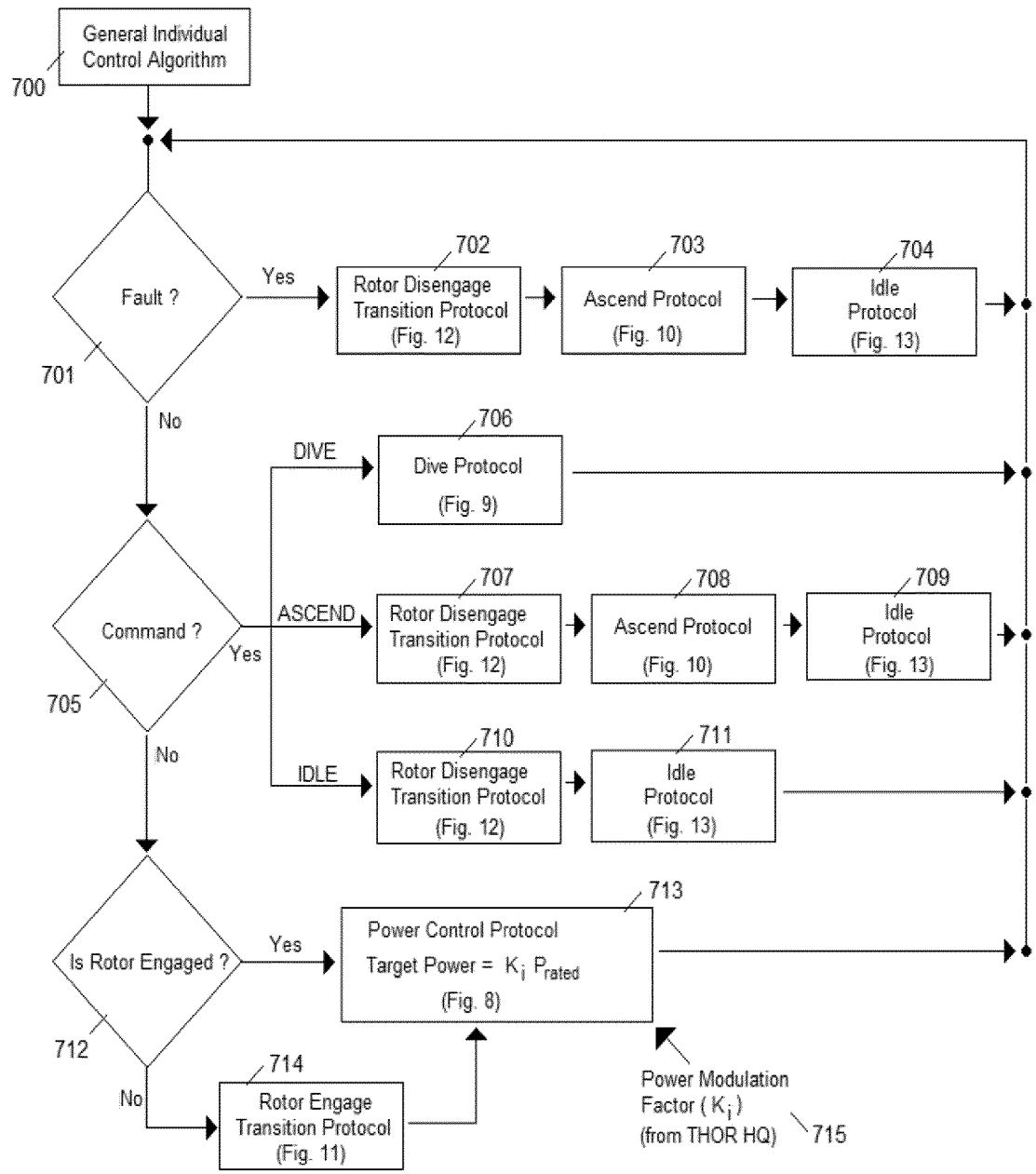
FIG. 7 shows an example of a process for controlling a hydrokinetic device in an ocean current farm array.

FIG. 7 shows an example of general individual control process 700 for controlling an individual hydrokinetic device in an ocean current farm array. The general individual control process 700 may be executed by the THOR controller associated with each individual hydrokinetic device in, for example, an ocean current farm array. During execution of the general individual control process 700, one or more faults or commands may be received at any time causing the THOR controller to interrupt the process, and subsequently respond to the fault or command in a timely or immediate manner.

In general, the hydrokinetic device is substantially always executing the power control process, including the depth change process (Step 711) using the assigned power modulation factor, Ki (Step 715), unless there is a previously detected fault condition (Step 701) or a command issued (Step 705) to accomplish another task. In the event that an individual device fault or a system fault is determined (Yes at step 701), the THOR controller may disengage the rotor (Step 702) and cause the hydrokinetic device to ascend (Step 703) to the surface or other specified depth and remain idle (Step 704) until the fault condition is resolved.

The THOR controller associated with each hydrokinetic device is capable of executing various commands including dive, ascend, idle and/or ADCP query. The commands may be issued, for example, by the THOR HQ, or internally generated by the THOR controller as will be described. The commands dive, ascend, idle and ADCP query may all be executed with the rotor in the disengaged non-operational condition under the control authority of the variable weight effector, the variable lift effector, the variable drag effector, and/or the energy transducer change effector such as a rotor blade pitch angle change effector. The rotor may be engaged to an operational condition just prior to entering the power control protocol (Step 714) and disengaged to a non-operational condition just after terminating the power control protocol (Step 713). At substantially all other times, the rotor may be disengaged from the flow and non-operational. The rotor may be engaged using the rotor engage transition protocol (Step 714). The rotor may be disengaged using the rotor disengage transition protocol (Steps 702, 707, 710).

Referring to FIG. 7, the THOR controller may monitor for an individual device fault or a system fault (Step 701). If a determination is made that an individual device fault or system fault has occurred (YES at Step 701), the THOR controller cause the rotor to be disengaged by executing the rotor disengage transition protocol (Step 702). The THOR controller may further causes the hydrokinetic device to ascend using the ascend protocol 703 (Step 703) to the surface or a specified depth, then the THOR controller may execute the idle protocol (Step 704) and cause the hydrokinetic device to loiter at idle power until intervention is accomplished or further continuing operational instructions are received.

The THOR controller may further monitor a communication link for a command from the THOR HQ, or the THOR controller may generate its own command (Step 705). If a dive command is determined to have been received (YES at Step 705), then the THOR controller may execute the dive protocol (Step 706), which may successfully conclude with the hydrokinetic device descending to the rated speed depth. If the dive protocol is unsuccessful and the rated speed depth is not achievable (Step 706), the THOR controller may cause the hydrokinetic device to enter the idle protocol (Step 709) at a predetermined depth and may include further execution of the ADCP query protocol (not shown).

If an ascend command is determined to have been received (YES at Step 705), then the THOR controller may execute the rotor disengage transition protocol (Step 707), when the rotor is not already in the disengaged non-operational condition, followed by execution of the ascend protocol (Step 708), causing the hydrokinetic device to rise to the surface or to a predetermined depth, then followed by execution of the idle protocol (Step 709), which may include the optional ADCP query protocol (not shown), causing the hydrokinetic device to loiter at the surface, at a specified depth, or at the depth at which a specified free stream current speed occurs under the control authority of the variable weight effector, the variable lift effector, the variable drag effector, and/or the energy transducer change effector such as a rotor blade pitch angle change effector. The hydrokinetic device may continue to execute the idle protocol (Step 709) without producing power until terminated by a subsequent externally or internally generated command.

Figure 14:
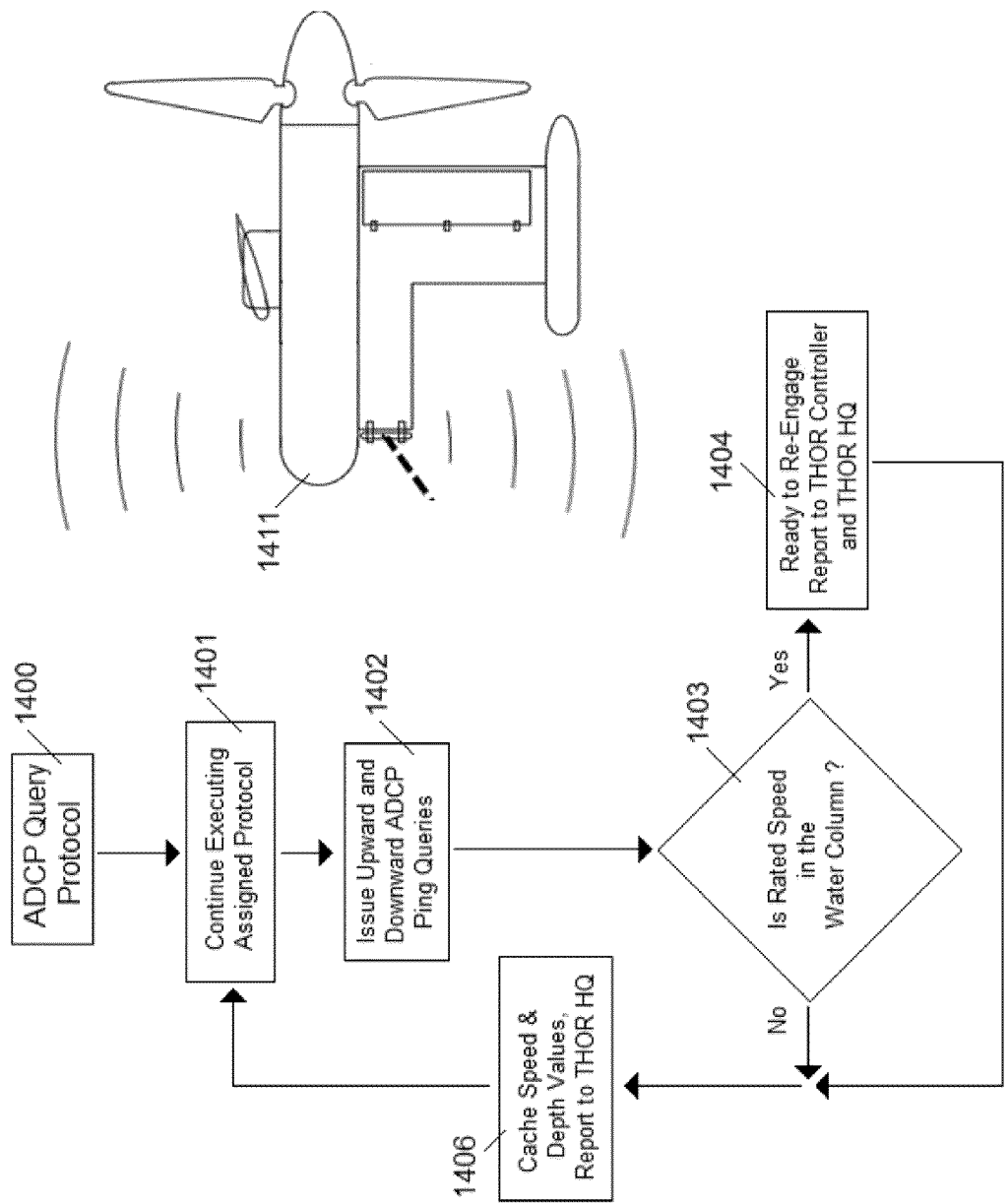
FIG. 14 shows an example of a process for determining a current speed.

If an idle command is determined to have been received (YES at Step 705), then the THOR controller may execute the rotor disengage transition protocol (Step 710), when the rotor is not already in the disengaged non-operational condition, followed by execution of the idle protocol (Step 711), which may include the optional ADCP query protocol shown in FIG. 14, causing the hydrokinetic device to loiter without power production at a specified depth, or at the depth at which a specified free stream current speed occurs under the control authority of the variable weight effector, the variable lift effector, the variable drag effector, and/or the energy transducer change effector such as a rotor blade pitch angle change effector. The hydrokinetic device may continue executing the idle protocol until terminated by a subsequent externally or internally generated command.

If the THOR controller does not determine or receive any faults (NO at Step 701) and no pending or unexecuted commands (NO at Step 705), then the THOR controller may determine whether the rotor is engaged (Step 712). If the THOR controller determines that the rotor is in the disengaged non-operational condition and the rotor blade pitch angles are fully feathered (NO at Step 712), the THOR controller may determine that the hydrokinetic device is at the rated speed depth and execute a rotor engage transition protocol (Step 714). If the THOR controller determines that the rotor is engaged (YES at Step 712), or the rotor has been engaged through execution of the rotor engage transition protocol (Step 714), then the THOR controller may execute the power control protocol (Step 713), causing the hydrokinetic device to track and recapture the rated power depth whilst producing rated power for extended periods of time, if the assigned power modulation factor has a value of unity (Step 715). If the assigned power modulation factor has a value of less than unity, the power control protocol (Step 713) may cause the hydrokinetic device to track and recapture a specified partial power depth, which generally may be a depth deeper than the rated power depth. The hydrokinetic device may continue to execute the power control protocol (Step 713) at the rated power depth until interrupted by a fault condition (YES at Step 701) or an intervening command (YES at Step 705).

Figure 8:
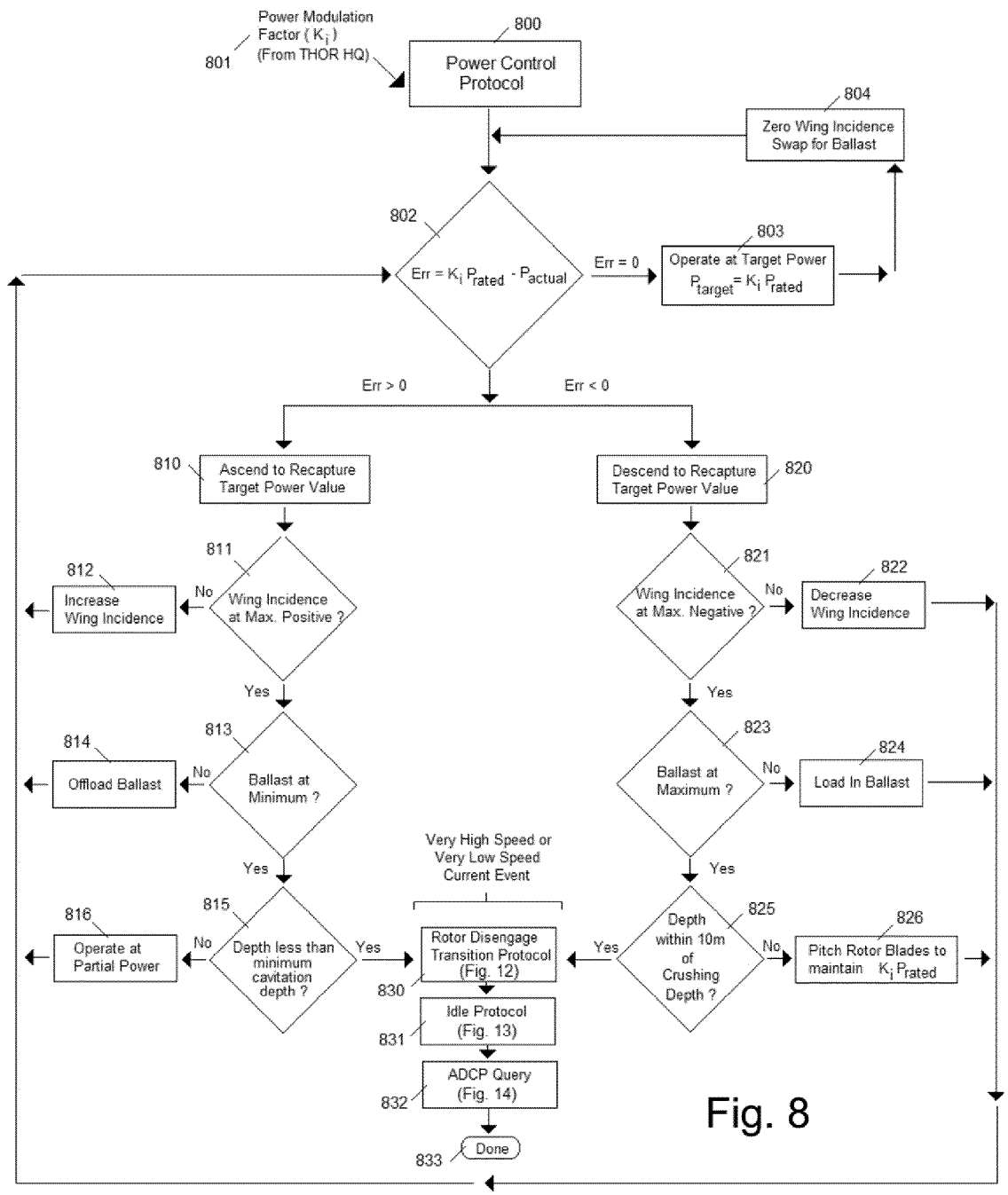
FIG. 8 shows an example of a further process for controlling a hydrokinetic device.

FIG. 8 shows an example of a power control process (or protocol) 800 for controlling a hydrokinetic device, including a depth change process. The power control process 800 may be executed by the THOR controller a vast majority of the time, causing the hydrokinetic device to track and recapture the rated power depth when the assigned power modulation factor is substantially equal to unity, or track and recapture the specified partial power depth corresponding to a power modulation factor that is less than about unity. In each case, the target power setting may be the product of the nameplate power rating of the hydrokinetic device and the assigned power modulation factor.

Referring to FIG. 8, the THOR controller may initiate the power control process 800, for example, after receiving a power modulation factor from THOR HQ (Step 801). The THOR Controller may calculate a power error signal Err based on the target power setting $K_i \cdot P_{rated}$ less the actual power $P_{actual}$ being produced (Step 802). If the power error signal Err is equal to about zero (Err=0 at Step 802), then the actual power $P_{actual}$ may be determined to be equal to the target power setting $K_i \cdot P_{rated}$ and no actions are taken (Step 803), except possibly to use more or less weight via the variable weight effector in place of the variable lift effector (Step 804) to minimize wake disturbance that may drift downstream and impinge on the energy transducer capture area, which may reduce power conversion efficiency.

In the case where the variable weigh effector includes one or more ballast tanks and the variable lift effector includes a hydrodynamic wing, if the power control error signal Err is determined to be equal to zero (Err=0 at Step 802), the THOR controller may take no action and allow continued operation (Step 803). If the ballast tanks still have room to either take on or offload ballast and the wing incidence is still not zero, the THOR controller may swap wing lift (or wing down force) for ballast weight to lessen the lifting or down force carried by the wing in order to minimize wake or flow angularity from the wing trailing edge that may drift downstream and impinge on the energy transducer capture area (Step 804), such wake may tend to reduce the energy conversion performance of the operational rotor.

If the power error signal Err is determined to be greater than zero (Err>0 at Step 802), indicating that the target power setting $K_i \cdot P_{rated}$ is greater than the actual power $P_{actual}$ being produced, then THOR controller may cause the hydrokinetic device to adjust in depth, in this case most likely to ascend (Step 810). The THOR controller may adjust, for example, the lift (Step 811) and weight (Step 813) via the variable lift effector and weight effector, respectively, to adjust the depth of the hydrokinetic device until the power error signal Err reduces to zero. Specifically, the THOR controller may cause the hydrokinetic device to adjust in depth by increasing the down force of the variable lift effector (for example, the wing incidence angle) (Step 812) to maximum positive values after determining that the variable lift effector (for example, the wing) is not at a maximum positive value (NO at Step 811). If the control authority of the variable lift effector is exhausted (YES at Step 811), and the power error signal Err is still greater than zero, then a determination may be made whether the control authority of the variable weight effector (for example, one or more ballast tanks) is exhausted (Step 813). If a determination is made that the control authority of the variable weight effector is not exhausted (for example, the ballast is not at a minimum) (NO at Step 813), then the variable weight effector may be employed (for example, offload ballast) until the power error signal Err reaches zero (Step 814). However, if a determination is made that the control authority of the variable weight effector is exhausted (YES at Step 813), then a determination may be made whether the actual depth of the hydrokinetic device is less than a minimum cavitation depth (Step 815). If a determination is made that the actual depth is greater than or equal to the minimum cavitation depth (NO at Step 815, then the hydrokinetic device may be operated in a partial power setting (Step 816).

If the power error signal Err remains greater than zero, considerable ascent may have occurred and the hydrokinetic device may be nearing the surface. In this event, it may be likely that a very low speed current event is occurring. If the hydrokinetic device remains below the minimum rotor cavitation depth (NO at Step 815), it may continue to operate at a partial power setting (Step 816), which is less than rated power and which may be less than the specified partial power setting if the power modulation factor is less than unity (Step 801).

If the hydrokinetic device rises above the minimum rotor cavitation depth (YES at Step 815), the THOR controller may interrupt the execution of the power control process 800 and may then execute the disengage rotor transition process (Step 830), followed by the idle process (Step 831), followed by the ADCP query process (Step 832). The ADCP query process may use the onboard ADCP to probe the vertical water column to determine when the free stream current speeds are favorable for continued power production.

If the power error signal Err is determined to be less than zero (Err<0), indicating that the target power setting $K_i \cdot P_{rated}$ is less than the actual power $P_{actual}$ being produced, then the THOR controller may cause the hydrokinetic device to adjust in depth, in this case most likely to descend (Step 820). The THOR controller may adjust, for example, the lift (Step 821) and weight (Step 823) via the variable lift effector and variable weight effector, respectively, to adjust the depth of the hydrokinetic device until the power error signal Err reduces to zero. Specifically, the THOR controller may cause the hydrokinetic device to adjust in depth by increasing the lift force of the variable lift effector (for example, decreasing the wing incidence angle of the wing) (Step 822) after determining that the variable lift effector (for example, the wing) is not at a maximum negative value (NO at Step 821). If the control authority of the variable lift effector is exhausted (YES at Step 821), and the power error signal Err is still greater than zero, then a determination may be made whether the control authority of the variable weight effector (for example, one or more ballast tanks) is exhausted (Step 823). If a determination is made that the control authority of the variable weight effector is not exhausted (for example, the ballast is not at a maximum) (NO at Step 823), then the variable weight effector may be employed (for example, load in ballast) until the power error signal Err reaches zero (Step 824). However, if a determination is made that the control authority of the variable weight effector is exhausted (YES at Step 823), then a determination may be made whether the actual depth of the hydrokinetic device is within a predetermined range of a crushing depth (for example, within 10 meters, or the like) (Step 825). If a determination is made that the actual depth is not within the predetermined range of the crushing depth (NO at Step 825) and the power error signal Err is still not zero, then the rotor blades may be pitched to shed power so as to maintain the rated power or maintain the specified partial setting (Step 826).

If the power error signal Err remains less than zero, considerable descent may have occurred and the hydrokinetic device may be nearing the maximum structural crushing depth. In this event, it may be likely that a very high speed current event is occurring, and it may be necessary to pitch the rotor blades to shed power so as to maintain the rated power or maintain the specified partial setting (Step 826) and avoid descending to a depth near the crushing depth.

If a determination is made that the actual depth is within the predetermined range of the crushing depth, or less (YES at Step 825), then the THOR controller may interrupt execution of the power control process 800 and execute the disengage rotor transition process (Step 830), followed by the idle process (Step 831), followed by the ADCP query process (Step 832). The ADCP query process may use the onboard ADCP to probe the vertical water column to determine when the free stream current speeds are favorable for continued power production.

When the power control error signal Err reaches zero (Err=0 at Step 802), the variable weight effector and the variable lift effector may be adjusted (Step 804) to minimize wake disturbance that may drift downstream and impinge on the energy transducer capture area, which may reduce power conversion efficiency. In the case where the variable weight effector includes one or more ballast tanks and the variable lift effector includes an adjustable wing, the wing incidence angle and the corresponding lift (or down-force) may be swapped for less ballast (or more ballast) (Step 804), so that the wing incidence angle and the lifting force (or down-force) both approach zero. By swapping weight for lift, any flow inclination or downwash angle that may have resulted from the wing carrying a lifting force and impinging on the energy transducer capture area may be reduced to substantially zero, thereby ensuring maximum energy conversion performance.

The power control process 800 may involuntarily terminate in the event of, for example, a very high speed current that may cause the THOR controller to command descent by the hydrokinetic device below a maximum structural crushing depth of the hydrokinetic device. Involuntary termination may also occur in the event of a very low speed current that may cause the THOR controller to command an ascent by the hydrokinetic device to a shallow depth which may cause excessive rotor blade cavitation or cause a rotor blade to pierce the water surface causing an unacceptable situation.

Figure 9:
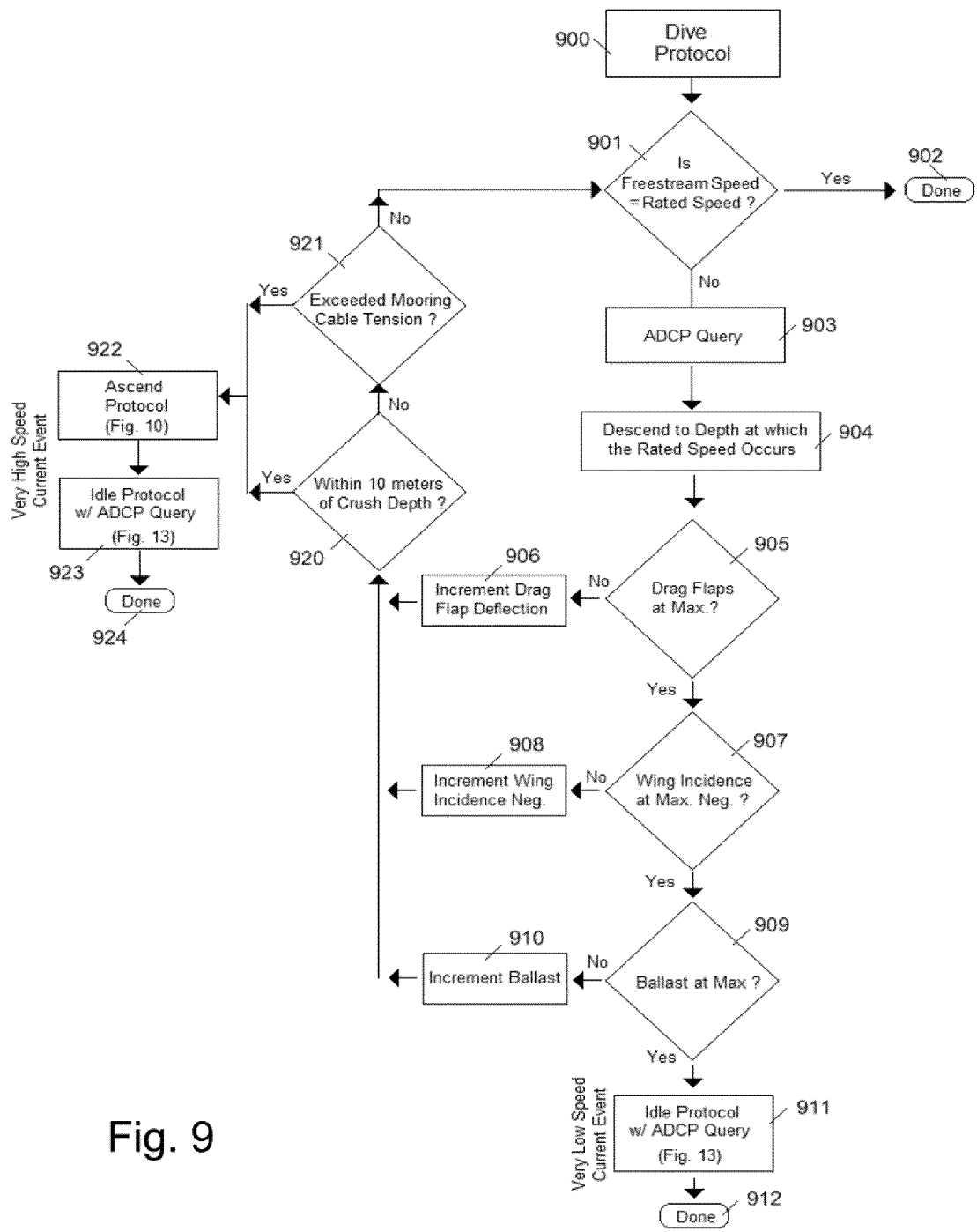
FIG. 9 shows an example of a process for controlling dive of a hydrokinetic device.

FIG. 9 shows an example of a dive process (or protocol) 900 for controlling a dive operation of a hydrokinetic device. The dive process 900 may be executed on, for example, the THOR controller to cause the hydrokinetic device to descend in depth to a rated speed depth. The dive process 900 may be effectuated with the control authority of the variable weight effector, the variable lift effector, the variable drag effector, and/or the energy transducer change effector such as a rotor blade pitch angle change effector in the disengaged non-operational condition. The dive process 900 may terminate successfully when the hydrokinetic device reaches the rated speed depth or a depth near the rated speed depth within an acceptable margin. The dive process 900 may terminate unsuccessfully if the rated speed depth, or a depth near the rated speed depth, is not achieved.

In general, the dive process 900 may first use the control authority of the variable drag effector to cause a descent, beginning from a semi-submerged surface condition or some interim depth. If the rated speed depth has not been achieved and the control authority of the variable drag effector is exhausted, the variable lift effector may be employed to create a down force to cause further descent. If the control authorities of both variable drag effector and variable lift effector are exhausted and the rated speed depth is still not achieved, the variable weight effector may be employed to cause further descent. If the control authority of all three of the variable drag effector, the variable lift effector and the variable weight effector are exhausted and the rated speed depth is still not achieved, it may be likely that a very low speed current event is occurring and the dive process 900 may terminate and the THOR controller may invoke the idle process 1300 (for example, shown in FIG. 14).

If the rated speed depth is achieved during the dive process using the authority of the variable weight effector, the variable lift effector, and/or the variable drag effector, and the rated speed depth is not at, near or below the maximum structural crushing depth of the hydrokinetic device, and the mooring cable tension limits are not exceeded, the dive protocol may terminate successfully after delivering the hydrokinetic device to the rated speed depth. If, during the descent process, the hydrokinetic device reaches within 10 meters or so of the maximum structural depth, or the mooring cable structural tension limits are exceeded, it may be likely that a very high speed current event is occurring and the THOR controller may interrupt the dive process 900 and invoke the ascent process 1000 (shown in FIG. 1000) followed by execution of the idle process 1300 (shown in FIG. 13).

Referring to FIG. 9, initially the actual, real-time free stream current speed is determined and compared to the rated speed (Step 901). If the speeds are the same (YES at Step 901), the dive is considered successful and complete (Step 902), otherwise the THOR controller may issue an ADCP query (NO at Step 902, then Step 903) to probe the vertical water column to determine the variation of free stream current speeds with depth to provide additional information as described with reference to FIG. 14. The hydrokinetic device may continue to descend to the rated speed depth at which the rated speed occurs (Step 904).

The hydrokinetic device may be caused to descend by, for example, first deploying (or incrementing) the variable drag effector (for example, the split drag flaps) (Step 906) to a high drag condition after determining that the variable drag effector is not in a maximum drag condition (for example, the drag flaps are not extended to maximum positions) (NO at Step 905). If the variable drag effector is in, or reaches a maximum drag condition (for example, the split flaps reach a maximum deflection) (YES at Step 905) and the rated speed depth has not been achieved, further descent may be accomplished by adjusting the variable lift effector (for example, hydrodynamic wing with variable incidence angles) (Step 908) to more negative values, after determining that the variable lift effector is not in a maximum down force condition (for example, wing incidence at maximum negative angle) (NO at Step 907). If the variable lift effector (for example, wing) is at, or reaches a maximum down force condition (for example, a maximum negative incidence angle) (YES at Step 907) and the rated speed depth has not been achieved, the variable weight effector (for example, ballast tank(s)) may be adjusted to increase the weight (for example, incrementally load the ballast tank(s)) (Step 910), after determining that the variable weight effector is not in a maximum weight condition (for example, ballast tanks are full) (NO at Step 909).

If all three control authorities—the variable drag effector, the variable lift effector, and the variable weight effector—have been exhausted (YES at Step 905, YES at Step 907, YES at Step 909) and the rated speed depth has not been achieved, it may be likely that there is a very low speed current event taking place and the dive process may terminate unsuccessfully (Step 912) with the THOR controller invoking the idle process 1300 (Step 911) as a means to loiter with no power production and wait out the anomalous very low speed current event.

During the dive process 900 as the variable drag, lift and weight effectors are progressively actuated, the actual depth of the hydrokinetic device may be monitored (Step 920), as well as the tension in the mooring cables (Step 921), so that preset limits are not exceeded. If the preset limits are exceeded or dangerously approached (YES at Step 920, or YES at Step 921), it may be likely that there is a very high speed current event taking place and the dive process may terminate unsuccessfully (Step 924) with the THOR controller invoking the ascend process 1000 (Step 922) followed by the idle process 1300 (Step 923) as a means to loiter and wait out the anomalous event. The dive process 900 may reach successful completion when the hydrokinetic device reaches the rated speed depth or a depth near the rated speed depth within an acceptable margin.

Although not shown in FIG. 9, it may be possible that after the application of the variable drag, lift and weight effectors that the hydrokinetic device descends and stabilizes at a depth that is slightly above the rated speed depth. Rather than terminate the dive process 900 unsuccessfully (Step 924), the rotor engage transition process 1100 (shown in FIG. 11) may be invoked so that as the rotor drag increases as the rotor blade pitch angles approach the operational condition, the drowning force may increase, causing further descent so that the hydrokinetic device reaches the rated speed depth.

Figure 10:
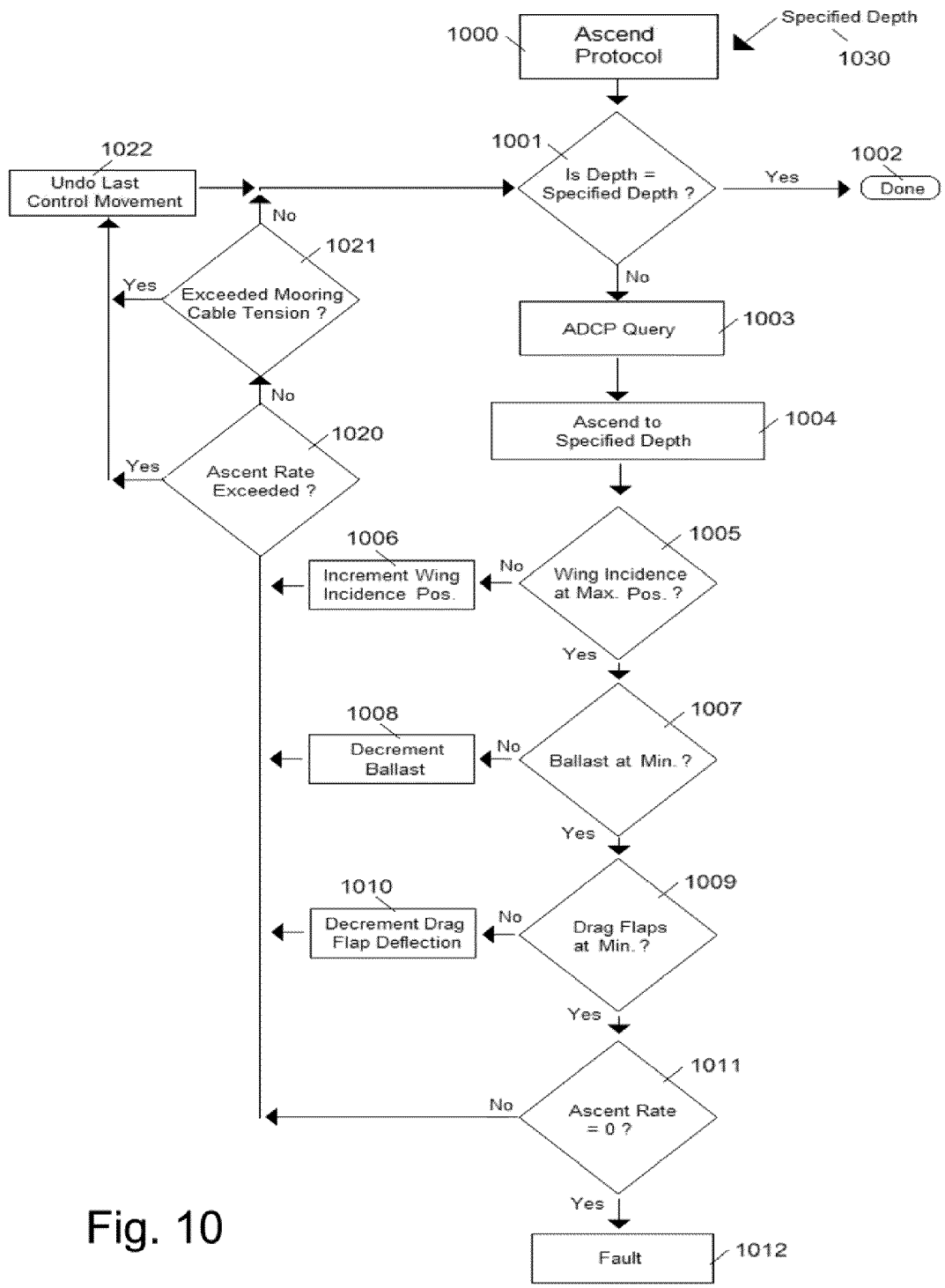
FIG. 10 shows an examples of a process for controlling ascend of a hydrokinetic device.

FIG. 10 shows an examples of an ascend process (or protocol) 1000 for controlling ascent of a hydrokinetic device. The ascend process 1000 may be executed on, for example, a THOR controller, to cause ascent of the hydrokinetic device to the surface or other specified depth. The ascend process 1000 may be effectuated with the control authority of the variable weight, lift and drag effectors and with the rotor in the disengaged non-operational condition. The ascend process 1000 may terminate successfully when the hydrokinetic device reaches a specified depth. The ascend process 1000 may terminate unsuccessfully in a fault condition when, for example, the specified depth cannot be achieved.

In general, the ascend process 1000 may first use the control authority of the variable lift effector to cause the hydrokinetic device to ascend. If the specified depth is not achieved and the control authority of the variable lift effector is exhausted, the variable weight effector may be employed to cause further ascent. If the control authorities of both the variable lift and weight effectors are exhausted and the specified depth is still not achieved, the variable drag effector may be employed to cause further ascent. If the control authority of all of the variable lift, weight and drag effectors are exhausted and the specified depth is still not achieved and the rate of ascent has reached substantially zero, then it may be likely that a catastrophic fault has occurred since the hydrokinetic device is positively buoyant. In this event, the THOR controller may send a signal to the station (THOR HQ) to dispatch service personnel. During the aforementioned ascent process, if a preset ascent rate or preset mooring cable tension is exceeded, the last control movement may be undone (reversed) so as to remove the last action that caused the preset limit to be exceeded.

Referring to FIG. 10, initially an actual, real-time depth of the hydrokinetic device may be determined and compared to the specified depth (Step 1001). If the specified depth has not been achieved (NO at Step 1001), an ADCP query 1003 may be issued to provide additional information as described with reference to FIG. 14 (Step 1003), otherwise the ascend process 1000 may terminate successfully (YES at Step 1001, then Step 1002). The hydrokinetic device may proceed to ascend to the specified depth (Step 1004). The variable lift effector (for example, wing) may be progressively adjusted (for example, incrementally increase the incidence angle to positive values to increase the angle of attack) to increase the lift of the hydrokinetic device (Step 1006), after determining that the variable lift effector has not reached a maximum lift condition (for example, a maximum wing incidence angle) (NO at Step 1005).

If the actual depth does not reach the specified depth (NO at Step 1001) and the a maximum lift condition is reached (YES at Step 1005), then, if the variable weight effector (for example, one or more ballast tanks) is not already at a minimum condition (for example, ballast at a minimum) (NO at Step 1007), then the variable weigh effector is progressively adjusted (for example, the ballast is progressively offloaded from the ballast tanks) (Step 1008).

If the actual depth is still not equal the specified depth (NO at Step 1001) and the variable drag effector (for example, split drag flaps) are not already in the no drag or low drag condition (NO at step 1009), then the variable drag effector may be progressively decremented (for example, the split drag flaps are retracted) (Step 1010) relieving drag, thereby reducing the apparent weight presented by the drowning force and causing further ascent.

If the actual depth is still not equal to the specified depth, then it may be likely that a catastrophic fault has occurred since the hydrodynamic device is positively buoyant. In this event, the THOR controller may send a signal to the THOR HQ to dispatch service personnel. During the ascent process 1000, the rate of ascent may be kept below a specified rate and the mooring cable tension forces may also be kept below a specified value by reversing the previous control action (YES at Step 1020, or YES at Step 1021, then Step 1022) that may have caused the specified maximum ascent rate or the specified maximum tension value to exceed preset limits. The ascent process 1000 may successfully conclude when the actual depth equals the specified depth (YES at Step 1001, then Step 1002).

Figure 11:
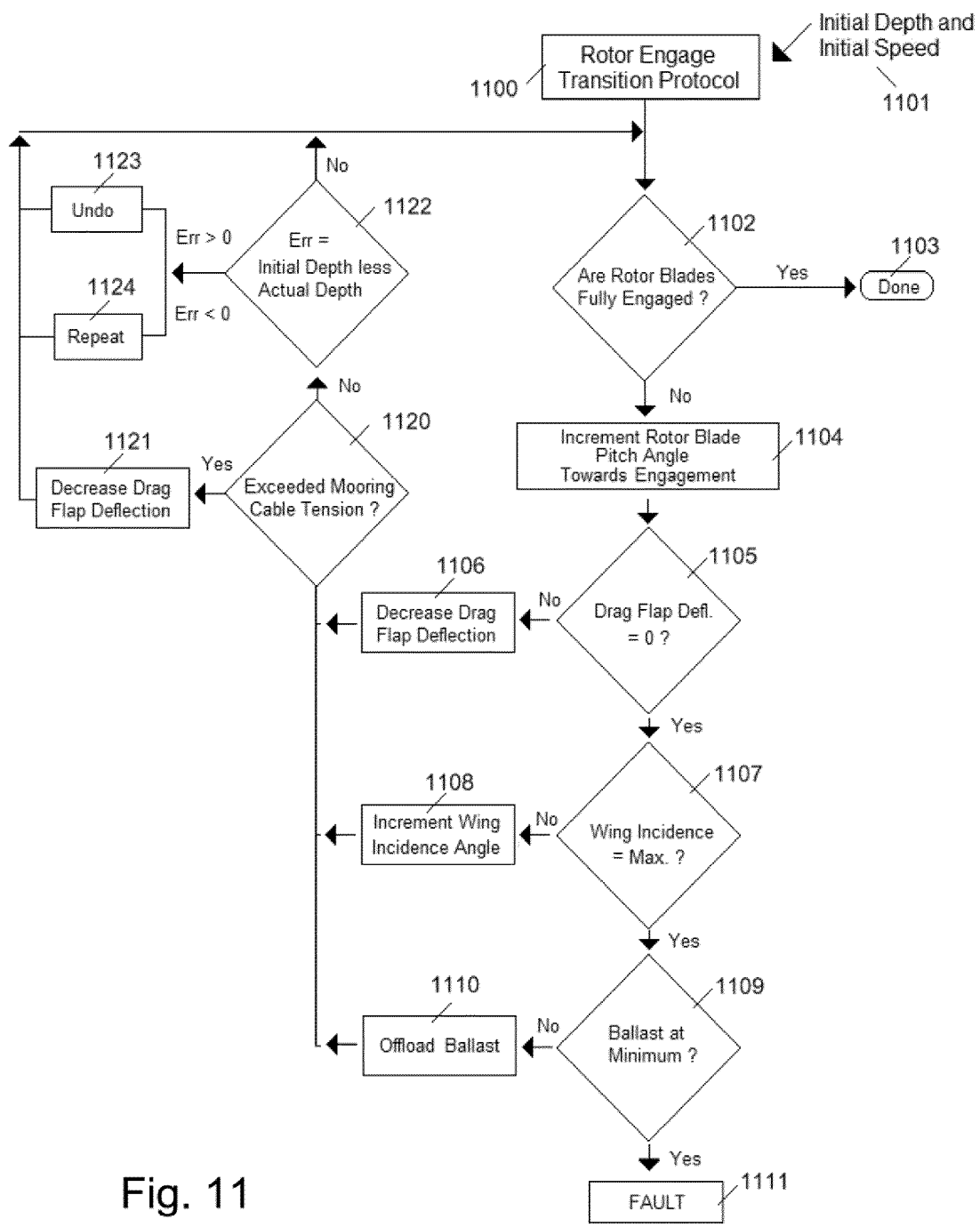
FIG. 11 shows an example of a process for engaging a rotor.

FIG. 11 shows an example of a rotor engage transition process (or protocol) 1100 for engaging a rotor. The rotor engage transition process may be executed, for example, by the THOR controller. The rotor engage transition process 1100 may be invoked following, for example, successful completion of the dive process 900 (shown in FIG. 9) and just prior to operation using the power control process 800 (shown in FIG. 8). Typically, the rotor engage transition process 1100 may be accomplished at the rated speed depth.

In general, in the rotor (transducer) engage transition process 1100, the rotor may be transitioned from a disengaged non-operational condition to an engaged operational condition. This transition may dramatically increase drag as the rotor blades approach operational pitch angles and the drag and drowning force associated with rotor operation progressively increase, while at the same time the drag produced by the variable drag effector may be progressively withdrawn. Further, the down force provided by the variable lift effector may be progressively reduced and the variable weight effector may also be incrementally reduced at a rate at which the rotor engage transition process 1100 occurs at constant depth or at a variable depth corresponding to a constant speed, both of which require a seamless net sum zero transition of vertical forces. During this transition process 1100, the mooring cable tension may be monitored and control effectuated in the event that mooring cable tension exceeds preset limits.

Specifically, the rotor engage transition protocol 1100 may begin with initial depth and initial speed as inputs (Step 1101). The THOR controller may conduct the rotor engage transition protocol 1100 at either the initial depth or at a variable depth corresponding to the initial speed. The initial speed may be the rated speed, as later described (Step 1122). If the rotor blades are not fully engaged (No at Step 1102) in the operational condition and the variable drag effector (for example, split drag flaps) is not in the no drag condition (NO at Step 1105), the drag effector may be progressively retracted (for example, the split drag flaps may be progressively deflected inward) (Step 1106) to the no drag condition as the rotor blade pitch angles continue to advance toward an operational condition (Step 1104). In this drag swap process between the variable drag effector (split drag flaps) and rotor blade pitch angle change, the decreasing drowning force attributable to the retraction of the drag effector (Step 1106) along with the increasing drowning force attributable to the advancement of the rotor blade pitch angles (Step 1104) may keep the vertical force balance at a net sum zero, thereby allowing the hydrokinetic device to remain at the initial depth or at a variable depth corresponding to the initial speed. If the rotor blade pitch angles have not reached the fully engaged operational pitch angle (NO at Step 1102), a second vertical force swap process may occur between the increasing drowning force attributable to the increasing drag of the advancing rotor blade pitch angles (Step 1104) and the increasing lift force (or similarly decreasing down force) attributable to positively increasing lift (for example wing incidence angles) of the variable lift effector (Step 1108), if the maximum lift condition (for example, wing incidence angle is not already at maximum) is not reached (NO at Step 1107). If the rotor blade pitch angles have still not reached the fully engaged operational pitch angle (NO at Step 1102), a third vertical force swap process may occur between the increasing drowning force attributable to the increasing drag of the advancing rotor blade pitch angles (Step 1104) and weight force withdrawal as the variable weight effector reduces the weight (for example, ballast in the ballast tanks is offloaded) of the hydrokinetic device (Step 1110), after a determination is made that the variable weigh effector is not in a minimum condition (for example, the ballast is at minimum) (NO at Step 1109).

If the rotor blades 1102 remain not fully engaged (NO at Step 1102), the variable drag effector is in a minimum or zero drag condition (YES at Step 1105), the variable lift effector is at maximum lift condition (YES at Step 1105), and the variable weigh effector is in a minimum weight condition (YES at Step 1109), then a fault signal may be generated (Step 1111).

During the above described vertical force swap processes in the rotor engage transition process 1100, mooring cable tension may be monitored (Step 1120) and corrective action taken, such as, for example a decrease in the drag via the variable drag effector (NO at Step 1120, then Step 1121) to ensure that the mooring cable tension does not exceed a preset limit. As seen in FIG. 11, a determination Err of whether the initial depth is less than the actual depth may be made to ensure that the rotor engage transition process 1100 occurs at the initial depth (Step 1122). In this regard, if, for example, the depth is determined to exceed preset limits (Err>0 at Step 1122), then the last control movement may be undone (reversed) (Step 1123) so as to remove the last action that caused a preset limit to be exceeded, otherwise the last control movement may be repeated (Err<0 at Step 1122, then Step 1124). The process in Step 1122 could also ensure that the rotor engage transition process 1100 occurs at a variable depth corresponding to the initial speed. Given that the rotor engage transition process 1100 may occur over a period of, for example, minutes, and that free stream current speed conditions may not change during the same period, the initial depth or initial speed decision represented in Step 1122 may be identical.

If the control authority of the variable weight, lift and drag effectors has been exhausted and the rotor blades have not reached the engaged operational condition (NO at Step 1102), the THOR controller may issue an ADCP query to determine the depth change that may result if the rotor blades were allowed to pitch to the engaged operational condition. If the depth change were deemed acceptable, the THOR controller may deviate from the initial depth or initial speed requirement (Step 1122) and complete the final pitch angle change of the rotor blades to the engaged operational condition (YES at Step 1102, then Step 1103). The rotor engage transition process 1100 may successfully complete when the rotor blade pitch angles are engaged and operational and the variable drag effector is in the fully retracted no drag condition (YES at Step 1102, then Step 1103).

Figure 12:
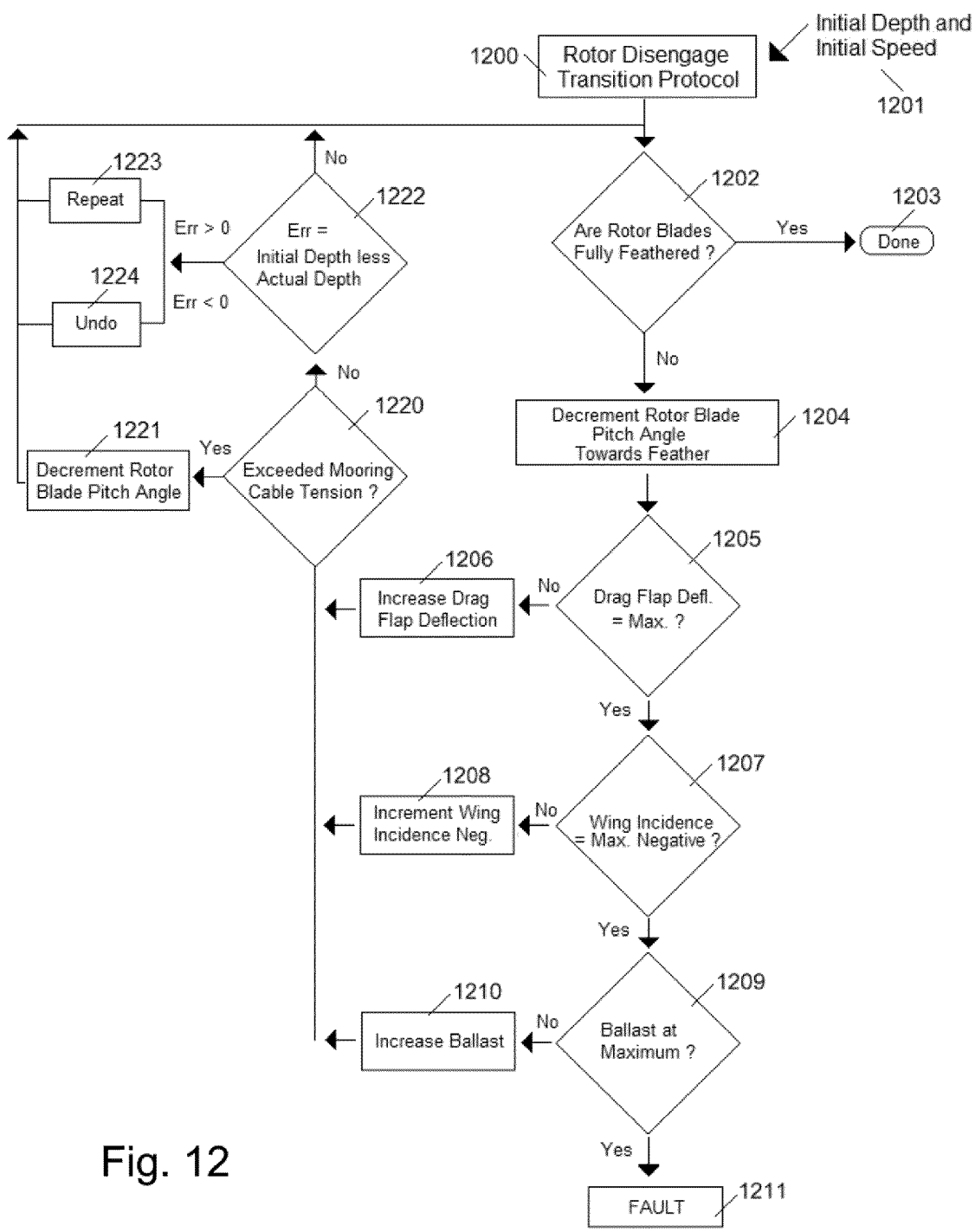
FIG. 12 shows an example of a process for disengaging a rotor.

FIG. 12 shows an example of a process rotor (transducer) disengage transition process (or protocol) 1200 for disengaging a rotor. The rotor disengage transition process 1200 may be invoked following termination of the power control process 800 (shown in FIG. 8) prior to the ascent process 1000 (shown in FIG. 10) or prior to the idle process 1300 (shown in FIG. 13). Typically, the rotor disengage transition process 1200 may be accomplished at the rated speed depth, or may be accomplished at other depths or free stream speeds. The rotor disengage transition process may be executed by, for example, the THOR controller to effect a rotor disengagement of the rotor on the hydrokinetic device.

In general, in the rotor disengage transition process 1200, the rotor is transitioned from an engaged operational condition to a disengaged non-operational condition, which may dramatically decrease drag as rotor blades approach non-operational fully feathered pitch angles. The drag and drowning force associated with rotor operation may be progressively withdrawn whilst the drag produced by the drag effector may be progressively incremented. Further, the down force provided by the lift effector may be progressively increased and the weight effector also incrementally increased at a rate at which the rotor disengage transition process 1200 occurs at constant depth or a variable depth corresponding to a constant speed, both of which require a seamless net sum zero transition of vertical forces. During this transition process, mooring cable tension may be monitored and control effectuated in the event that mooring cable tension exceeds preset limits.

Specifically, the rotor disengage transition process 1200 begins with initial depth and initial speed as inputs (Step 1201). The THOR controller may conduct the rotor disengage transition process 1200 at constant depth or constant speed (Step 1222). If the rotor blades are not fully feathered and disengaged (NO at Step 1202) in the non-operational condition and the variable drag effector is not in a high drag condition (NO at Step 1205), the drag effector may be progressively deployed (for example, drag flaps may be progressively deflected outward) (Step 1206) to a high drag condition as the rotor blade pitch angles continue to decrement (Step 1204) toward the fully feathered non-operational condition. In this drag swap process between the drag effector and rotor blade pitch angles, the increasing drowning force attributable to the increase in drag by the drag effector (Step 1206) along with the decreasing drowning force attributable to the decrement of the rotor blade pitch angles (Step 1204) may keep the vertical force balance at a net sum zero thereby allowing the hydrokinetic device to remain at constant depth or at a variable depth corresponding to a constant speed.

If the rotor blade pitch angles have not reached the fully feathered non-operational condition (NO at Step 1202) and the control authority of the drag effector is exhausted (for example, the drag flaps are deflected to a maximum position) (YES at Step 1205), a second vertical force swap process may occur between the decreasing drowning force attributable to the decreasing drag of the decrementing rotor blade pitch angles (Step 1204) and the down force increase as lift (for example, wing incidence angle) is decreased to more negative values by the lift effector (Step 1208).

If the rotor blade pitch angles have still not reached the fully feathered non-operational condition (NO at Step 1202) and the control authority of the lift effector (for example, wing) is exhausted (for example, the wing incidence is at a maximum negative value) (YES at Step 1207), a third vertical force swap process may occur between the decreasing drowning force attributable to the decreasing drag of the decrementing rotor blade pitch angles (Step 1204) and a weight increase by the weight effector (for example, ballast in the ballast tanks is increased) (Step 1210).

If the rotor blade pitch angles have still not reached the fully feathered non-operational condition (NO at Step 1202) and the control authority of the weigh effector is exhausted (for example, the ballast is at maximum) (YES at Step 1209), then a fault condition may be determined (Step 1211).

During the above vertical force swap processes, mooring cable tension may be monitored (Step 1220) and corrective action taken, such as, for example, decreasing the drag (for example, decreasing the drag flap deflection) (NO at Step 1120, then Step 1221) to ensure that the mooring cable tension does not exceed a preset limit. As seen in FIG. 12, a determination Err of whether the initial depth is less than the actual depth may be made to ensure that the rotor disengage transition process 1200 occurs at the initial depth (Step 1222). In this regard, if, for example, the depth is determined to exceed preset limits (Err>0 at Step 1222), then the last control movement may be undone (reversed) (Step 1223) so as to remove the last action that caused a preset limit to be exceeded, otherwise the last control movement may be repeated (Err<0 at Step 1222, then Step 1224). The process in Step 1222 could also alternatively ensure that the transition process 1200 occurs at the depth corresponding to a constant speed by using an error signal based on speeds (Step 1222). Given that the rotor disengage transition process 1200 may occur over a period of for example, minutes, and that free stream current speed conditions may not change during a short duration period, the constant depth or constant speed decision represented in Step 1222 may be identical.

If the control authority of the weight, lift and drag effectors have been exhausted and the rotor blades have not reached the disengaged non-operational condition, the THOR controller may issue an ADCP query to determine the depth change that may result if the rotor blades were allowed to pitch to the disengaged non-operational condition. If the depth change were deemed acceptable, the THOR controller may deviate from the constant depth or constant speed requirement of Step 1222 and complete the remaining pitch angle change of the rotor blades to the disengaged non-operational condition. The rotor disengage transition process 1200 may successfully complete when the rotor blade pitch angles are disengaged and non-operational and the drag effector is extended to a high drag condition (YES at Step 1202, then Step 1203).

Figure 13:
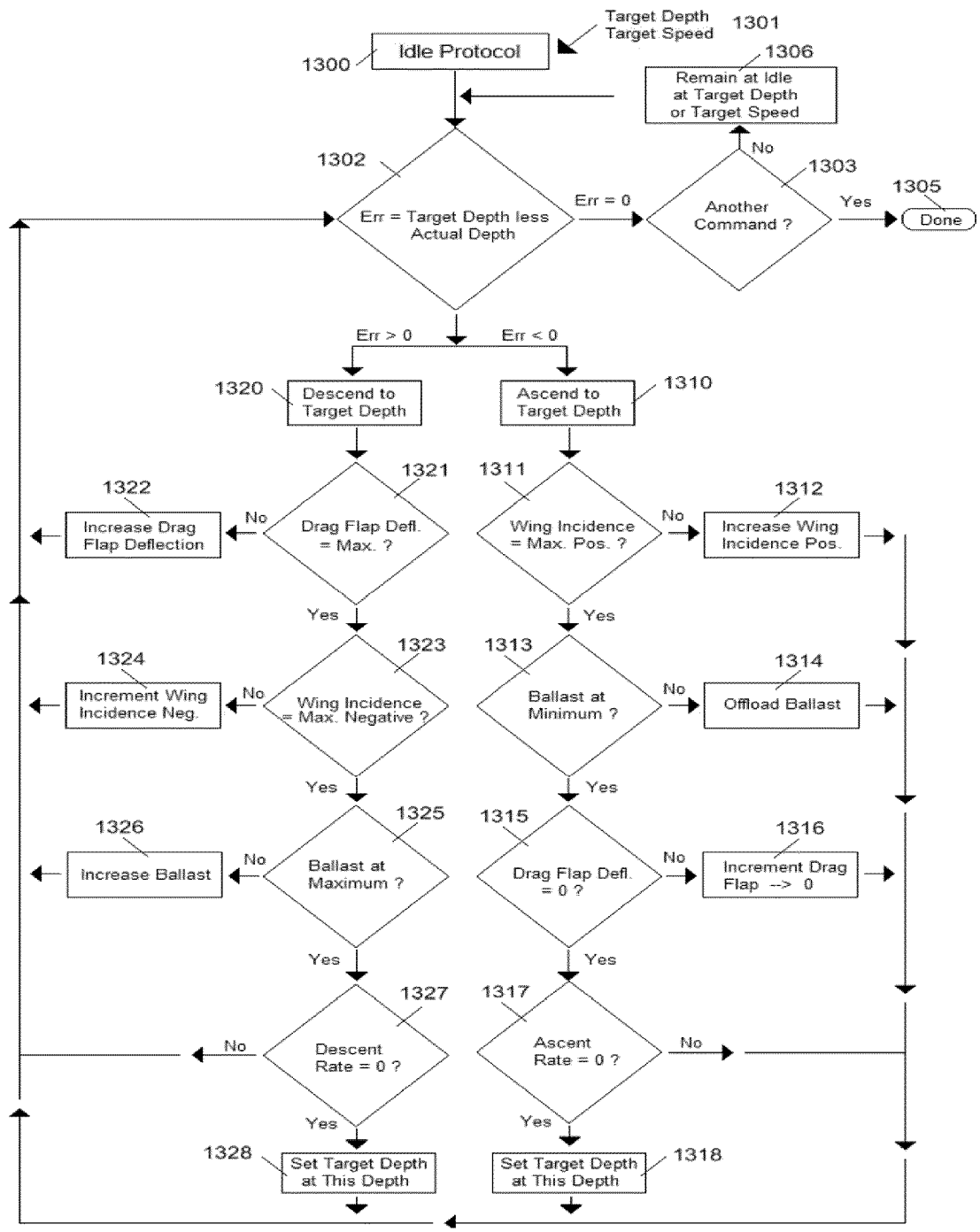
FIG. 13 shows an example of a process for maintaining a rotor substantially idle.

FIG. 13 shows an example of an idle process (or protocol) 1300 for maintaining the hydrokinetic device at substantially zero power production. The idle process 1300 may be executed, for example, by the THOR controller. The idle process 1300 may be invoked whenever it is advantageous to halt power production and cause the hydrokinetic device to idle or loiter at a constant depth or at a variable depth that corresponds to a constant speed. The idle process 1300 may be employed during the passage of catastrophic weather events, including hurricanes, typhoons, tsunamis or the like and may also be employed during the passage of endangered marine mammals or the like for the purpose of ensuring collision avoidance. The idle process 1300 may also be invoked by the THOR controller during anomalous free stream current events, like very high speed or very low speed events.

In general, the idle protocol 1300 employs the control authority of the weight, lift and drag effectors to remain at a specified constant target depth or at a variable depth that corresponds to a constant target speed. In order to remain idle and ascend to track targets as free stream current flow conditions change (Step 1310), the control authority of the lift effector may first be exhausted (for example, incase wing incidence angle until maximum position reached) (Step 1312, YES at Step 1311) and if the target depth or target speed is not achieved, the control authority of the weight effector may next be exhausted (for example, offload ballast until minimum reached) (Step 1314, YES at Step 1313) to achieve the target depth or target speed. If the targets are still not achieved, the control authority of the drag effector may be employed (for example, decrease drag flap deflection until deflection is substantially zero) to achieve the target depth or target speed (Step 1316). A determination may be made whether the ascent rate is substantially equal to zero (Step 1317). If the ascent rate is substantially equal to zero (YES at Step 1317), and the target is still not achieved, and the drag effector is exhausted (YES at Step 1315), then the target depth or target speed may be reset at the speed or depth that occur after slightly withdrawing a portion of the weight, lift and drag (Step 1318) so that there is still margin in the control authority of the variable weight, lift and drag effectors to compensate for speed or depth.

In order to remain idle and descend (Step 1320) to track the targets as free stream current flow conditions change, the control authority of the drag effector may first be exhausted (for example, increase drag flap deflection until deflection reaches maximum) (Step 1322, YES at Step 1321) and if the target depth or target speed is not achieved, the control authority of the lift effector may next be exhausted (for example, increment wing incidence angle to negative values until maximum negative value reached) (Step 1324, YES at Step 1323) to achieve the target depth or target speed. If the targets are still not achieved, the control authority of the weight effector may be employed (for example, increase ballast) (Step 1326) to achieve the target depth or target speed.

If the targets are still not achieved, and the control authority of the weight effector has been exhausted (for example, ballast is at maximum) (YES at Step 1325), a determination may be made whether the descent rate is substantially equal to zero (Step 1327). If the descent rate is substantially equal to zero (YES at Step 1327), and the target is still not achieved, and the weight effector is exhausted (YES at Step 1325), then the target depth or target speed may be reset (Step 1328) at the speed or depth that occur after slightly increasing a portion of the weight, lift and drag effectors so that there is still margin in the control authority of the effectors to compensate for speed or depth. Additionally, the idle process 1300 may include the ADCP query protocol as described in FIG. 13 so that the hydrokinetic device may use the onboard ADCP unit to probe the vertical water column to determine if conditions are favorable for power production.

Specifically if a target depth is specified (Step 1301), a depth error signal may be calculated as the target depth less the actual depth (Step 1302). If a target speed is specified (Step 1301), a speed error signal may be calculated as the actual speed less the target speed (Step 1302). If the error signal is determined to be greater than zero (Err>0, at Step 1302), then the THOR controller may adjust the depth of the hydrokinetic device, most likely to a deeper depth (Step 1320), by first extending the drag effector (for example, split drag flaps) to a high drag condition (Step 1322) causing an increase in the drowning force causing further descent, if the drag effector (split drag flaps) is not already fully extended (No at Step 1321).

If the error signal remains greater than zero (Err>0, at Step 1302), the lift effector may be employed (for example, the wing incidence angle may be advanced to more negative values) (Step 1324), thereby increasing down force and causing further descent, if the down force (incidence angle) is not already at the maximum negative value (NO at Step 1323).

If the error signal still remains greater than zero, the weigh effector may be employed (for example, the ballast in the ballast tanks may be increased) (Step 1326) causing still further descent, if the weight is not already at the maximum (No at Step 1325).

If the descent rate reaches about zero (YES at Step 1327) and the error signal is still greater than zero (Err>0, at Step 1302), weight (ballast) may be slightly offloaded and the down force may be slightly reduced to retain some margin of control authority in the weight and lift effectors and the target depth or target speed may be reset at the present depth or speed thus causing the error signal Err to be zero (Step 1302). Once the error signal is zero (Err=0, at Step 1302), the idle process 1300 may maintain the present depth or speed (Step 1306) by ensuring zero error signal (Err=0, at Step 1302). The idle process 1300 may be terminated when, for example, the THOR controller invokes another command (Step 1303).

If the error signal Err is less than zero (Err<0, at Step 1302), the THOR controller may adjust the depth of the hydrokinetic device, most likely to a shallower depth (Step 1310), by first increasing the lift (for example, the wing incidence angle) (Step 1312) to more positive values, if the lift (incidence angle) is not already at the maximum positive value (NO at Step 1311).

If the error signal is still less than zero (Err<0, at Step 1302), weight may be decreased (for example, the ballast in the ballast tanks may be decreased) (Step 1314), causing still further ascent, if the weight (ballast) is not already at the minimum (NO at Step 1313).

If the error signal is still less than zero (Err<0, at Step 1302), the drag may be progressively decreased (for example, the split drag flaps may be progressively retracted) (Step 1316), if the drag is not already in a minimal drag condition (NO at Step 1315).

If the ascent rate reaches about zero (Step 1317) and the error signal is still less than zero (Err<0, at Step 1302), weight (ballast) may be slightly increased and the down force may be slightly increased to retain some margin of control authority in the weight and lift effectors and the target depth or target speed may be reset at the present depth or speed (Step 1318), thus causing the error signal Err to be zero. Once the error signal is zero (Err=0, at Step 1302), the idle process 1300 may maintain the present depth or speed (Step 1306) by ensuring a zero error signal Err. The idle process 1300 may be terminated when the THOR controller invokes another command (step 1303).

FIG. 14 shows an example of an acoustic Doppler current profile (ADCP) query process (or protocol) 1440 for determining a current speed. The hydrokinetic device may contain an onboard upward and/or downward looking ADCP unit 1411 capable of issuing sound frequency 'pings' into the vertical water column above and below the hydrokinetic device to query the existing free stream current flow field speeds and the depths at which the speeds occur (Step 1402). The data returned by the ADCP query process 1400 may have many uses, including determining whether the rated speed of the hydrokinetic device exists anywhere in the vertical water column, or may include additional information that may be used by higher level predictive and/or corrective or lead and/or lag control algorithms that may enhance the application of the methods presented herein, but yet not depart from the scope or spirit of the methods presented herein.

In general, the ADCP query process 1400 may be invoked at any time and not interrupt an ongoing process that may then be in execution (Step 1401). The ADCP unit 1411 may issue the sound frequency 'pings' into the vertical water column above and below the hydrokinetic device to query the existing free stream current flow field speeds and the depths at which the speeds occur (Step 1402). A determination may be made whether the rated speed is in the water column (Step 1403). If a determination is made that the rated speed is in the water column (YES at Step 1403), then the ADCP unit 1411 may re-engage and report to the THOR controller and/or the THOR HQ (Step 1404) and cache the speed and depth values and/or report to the THOR HQ (Step 1406) If a determination is made that the rated speed is not in the water column (NO at Step 1403), then the measured speed and depth values are stored and/or reported to the THOR HQ (Step 1406).

The data from the ADCP query, including the rated speed data (Step 1403) may be stored in a memory (not shown) of the THOR controller, communicated to the THOR HQ, or it may be used to cause the THOR controller to terminate the idle process, initiate the dive process and subsequently enter the power control process for continued power production (Step 1406).

According to an aspect of the disclosure, a computer readable medium may be provided that includes a computer program with a plurality of code sections (or segments) tangibly embodied therein. The computer program may include a code section for each of the steps in the processes 350, 360, 600, 700, 800, 900, 1000, 1100, 1200, 1300, and 1400, shown in FIGS. 2C, 2D, 6, 7, 8, 9, 10, 11, 12, 13, and 14. When executed on, for example, the onboard controller in the hydrokinetic device 100, or the station, the computer program may cause each of the steps in the processes 350, 360, 600, 700, 800, 900, 1000, 1100, 1200, 1300, or 1400 to be carried out.

Methods and protocols have been disclosed that may be employed by a controller to effect the operations of a hydrokinetic device for various advantages, including maximizing, modulating and/or controlling the power output of a single hydrokinetic device or an array thereof. Given the inverse velocity shear behavior of the free stream current in which the hydrokinetic device(s) are deployed, the concepts of the rated speed depth (the depth at which the rated speed occurs) and the rated power depth (the depth at which the rated power is achieved) were introduced as well as the discovery that inherent in the current flow behavior there exists a single speed that most frequently occurs at any depth, the single maxima speed. Further, by fashioning the hydrokinetic device with the rated speed corresponding to the single maxima speed, and by using the power control process (protocol) with depth change process (protocol) of the present disclosure, the hydrokinetic device may be compelled to continually track and recapture the rated power depth by modulating variable weight, lift and drag effectors, thereby causing rated power production for prolonged periods of time. Tracking and recapturing of the rated power depth includes, setting a target generator power out, mechanisms for sensing generator power output and in response to sensing the generator power output, invoking a power control process (or protocol) with a depth change process to maintain the hydrokinetic device at the target generator power output. The additional concept of the specified partial power depth and power modulation factor allows for the modulation and control of power production levels from a single hydrokinetic device or an array thereof.

A rotor (transducer) engage and rotor (transducer) disengage transition protocol are disclosed that allow for the seamless exchange of control authority between the weight, lift and drag effectors and the engaging operational or disengaging non-operational rotor blade pitch angles, respectively. These transition protocols may occur with a vertical force net sum zero objective which may occur at a constant depth or a variable depth corresponding to a constant speed. These transition protocols may further occur with a constant drag objective which may occur at a constant depth or a variable depth corresponding to a constant speed.

Other processes (or protocols), including dive, ascend, idle and ADCP were described that provide for other operational advantages. The various methods presented herein may be combined to varying degrees to produce other methods for maximizing, modulating and controlling operations and energy output of a hydrokinetic device without departing from the scope or spirit of the present disclosure. Other higher level techniques, including predictive/corrective, lead/lag and/or anticipation based control algorithms may be incorporated with the methods presented to drive error signals to zero more quickly without departing from the scope or spirit of the present disclosure. While a preferred embodiment of the disclosure has been described using specific terms, such description is for illustrative purposes only, and it is to be understood that changes and variations may be made without departing from the spirit or scope of the following claims.

In accordance with various embodiments of the present disclosure, the methods described herein are intended for operation as software programs running on a computer. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

Although the present specification describes components and functions implemented in the embodiments with reference to particular standards and protocols, the disclosure is not limited to such standards and protocols. Accordingly, replacement standards and protocols having the same functions are considered equivalent.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A method for controlling a hydrokinetic device that includes an energy transducer, the method comprising:
    setting a target generator output level for the hydrokinetic device;
    monitoring an actual generator output level of the hydrokinetic device;
    comparing the target generator output level to the actual generator output level to determine an error signal; and
    adjusting a depth of the hydrokinetic device based on the error signal to maintain the hydrokinetic device at the target generator output level.

2. The method according to claim 1, wherein said adjusting a depth of the hydrokinetic device comprises:
    invoking a power control protocol with depth change protocol.

3. The method according to claim 1, wherein the adjusting the depth of the hydrokinetic device comprises altering one of a weight, a lift or a drag of the hydrokinetic device based on the error signal.

4. The method according to claim 3, when the error signal is zero or near zero, the method further comprising:
    exchanging lift for weight in equal amounts to minimize flow disturbances.

5. The method according to claim 1, further comprising:
    determining a rotor size based on a single free stream current speed that occurs most frequently in a vertical water column.

6. The method according to claim 1, further comprising:
    adjusting a rotor swept area based on the single free stream current speed that occurs most frequently in the vertical water column.

7. The method according to claim 1, further comprising:
    monitoring a plurality of parameters;
    comparing each of the plurality of parameters to preset limits established for each of said plurality of parameters; and
    invoking a fault condition when one or more of the plurality of parameters exceed the preset limits established for said one or more of the plurality of parameters.

8. The method according to claim 7, wherein the fault condition comprises:
    disengaging the energy transducer from a fluid flow until said one or more of the plurality of parameters are equal to or less than the respective preset limits.

9. The method according to claim 7, wherein the plurality of parameters comprise:
    a free stream current speed in a column of water;
    an actual depth of the hydrokinetic device in the column of water;
    a mooring cable tension;
    a presence of a marine creature that may create a collision hazard;
    a passage of a potentially catastrophic weather event;
    an actual, real-time generator power output level; or
    a power modulation factor.

10. The method according to claim 1, wherein the hydrokinetic device is deployed in an array of hydrokinetic devices, each having an energy transducer, the method further comprising:
    sending an actual generator power output level measurement signal to a station; and
    receiving an individual power modulation factor from the station.

11. The method according to claim 10, wherein the actual generator power output level is aggregated at the station with another actual generator power output level received from another one of the hydrokinetic devices in the array of hydrokinetic devices.

12. The method according to claim 10, wherein the individual power modulation factor is generated based on a target aggregate power output level for all of the hydrokinetic devices in the array of hydrokinetic devices and an actual aggregate power output level for all of the hydrokinetic devices in the array of hydrokinetic devices.

13. The method according to claim 1, wherein the hydrokinetic device is deployed in an array of hydrokinetic devices, the method further comprising:
    receiving an individual power modulation factor from a station,
    wherein the depth of the hydrokinetic device is further adjusted based on the individual power modulation factor.

14. The method according to claim 1, wherein the energy transducer is a variable control rotor.

15. A method for operating a hydrokinetic device that includes an energy transducer, the method comprising:

progressively increasing or decreasing the amount by which the energy transducer is engaged or disengaged from a fluid flow, and
progressively changing at least one of a weight, a lift or a drag of the hydrokinetic device, so that the hydrokinetic device attains or maintains a predetermined condition.

16. The method according to claim 15, wherein the predetermined condition comprises:
an aggregate vertical force balance that is substantially zero.

17. The method according to claim 15, wherein the predetermined condition comprises:
an aggregate drag force balance that is substantially zero.

18. The method according to claim 15, wherein the predetermined condition comprises:
a depth that corresponds to a free stream current speed.

19. A method for controlling an array of hydrokinetic devices, each hydrokinetic device comprising an energy transducer, the method comprising:
setting a target aggregate power level for the array of hydrokinetic devices;
monitoring an actual aggregate power output level of the array of hydrokinetic devices;
comparing the target aggregate power level and the actual aggregate power output level to determine an error signal;
assigning a power modulation factor to one or more of the hydrokinetic devices in the array of hydrokinetic devices; and
adjusting a depth of the one or more hydrokinetic devices based on the error signal to maintain the array of hydrokinetic devices at the target aggregate power level.

20. The method according to claim 17, wherein said adjusting a depth of the one or more hydrokinetic devices comprises:
invoking a power control protocol with depth change protocol.

21. The method according to claim 19, further comprising:
progressively changing at least one of a weight, a lift or a drag of at least one of the hydrokinetic devices in the array of hydrokinetic devices, so that the hydrokinetic device attains or maintains a specified power output level.

22. The method according to claim 21, wherein the specified power output level comprises:
a product of a rated power and the power modulation factor.

23. The method according to claim 21, wherein the specified power output level is communicated in real time to a station.

24. A system for controlling a hydrokinetic device, the system comprising:
an onboard controller that is configured to (i) set a target condition for the hydrokinetic device, (ii) monitor an actual condition of the hydrokinetic device, (iii) compare the target condition to the actual condition to determine an error signal, and (iv) adjust a depth of the hydrokinetic device based on the error signal;
an energy transducer that is configured to harness kinetic energy from a water current; and
a variable effector that is configured to maintain the hydrokinetic device at the target condition.

25. The system according to claim 24, wherein the variable effector comprises:
a variable weight effector that is configured to adjust a weight of the hydrokinetic device;
a variable lift effector that is configured to adjust lift of the hydrokinetic device;
a variable drag effector that is configured to adjust drag of the hydrokinetic device; or
an energy transducer change effector that is configured to adjust a rate at which the kinetic energy is harnessed by the energy transducer.

26. The system according to claim 24, wherein:
the target condition comprises a target generator power output level; and
the actual condition comprises an actual generator power output level.

27. The system according to claim 26, wherein the hydrokinetic device is deployed in an array of hydrokinetic devices, each having an energy transducer, the system further comprising:
an onboard communicator that is configured to send the actual generator power output level to a station, and to receive an individual power modulation factor from the station.

28. The system according to claim 27, wherein the actual generator power output level is aggregated at the station with another actual generator power output level received from another one of the hydrokinetic devices in the array of hydrokinetic devices.

29. The system according to claim 27, wherein the individual power modulation factor is generated based on a target aggregate power output level for all of the hydrokinetic devices in the array of hydrokinetic devices and an actual aggregate power output level for all of the hydrokinetic devices in the array of hydrokinetic devices.

30. The system according to claim 24, wherein:
the target condition comprises a target free stream current speed; and
the actual condition comprises an actual free stream current speed.

31. The system according to claim 24, wherein the onboard controller is further configured to (iv) monitor a plurality of parameters, (v) compare each of the plurality of parameters to preset limits established for each of said plurality of parameters, and (vi) invoke a fault condition when one or more of the plurality of parameters exceed the preset limits established for said one or more of the plurality of parameters.

32. The system according to claim 31, wherein the fault condition comprises:
disengaging the energy transducer from a fluid flow until said one or more of the plurality of parameters are equal to or less than the respective preset limits.

33. The system according to claim 31, wherein the plurality of parameters comprise:
a free stream current speed in a column of water;
an actual depth of the hydrokinetic device in the column of water;
a mooring cable tension in a mooring cable;
a presence of a marine creature that may create a collision hazard;
a passage of a potentially catasrophic weather event;
an actual power output level; or
a power modulation factor.

34. The system according to claim 24, wherein the hydrokinetic device is deployed in an array of hydrokinetic devices, the system further comprising:
an onboard communicator that is configured to receive an individual power modulation factor from a station,
wherein the variable effector is controlled based on the individual power modulation factor.

35. A method for controlling a hydrokinetic device that includes a variable control rotor, the method comprising:

setting a target condition for the hydrokinetic device;
monitoring an actual condition of the hydrokinetic device;
comparing the target condition to the actual condition to determine an error signal; and
adjusting a depth of the hydrokinetic device based on the error signal to maintain the hydrokinetic device at the target condition,
wherein the target condition comprises a target generator power output level or a target free stream current speed; and
wherein the actual condition comprises an actual generator power output level or an actual free stream current speed.

36. The method according to claim 35, wherein said adjusting a depth of the hydrokinetic device comprises:
invoking a power control protocol with depth change protocol.

37. The method according to claim 35, further comprising:
monitoring a plurality of parameters;
comparing each of the plurality of parameters to preset limits established for each of said plurality of parameters; and
invoking a fault condition when one or more of the plurality of parameters exceed the preset limits established for said one or more of the plurality of parameters.

38. The method according to claim 37, wherein the fault condition comprises:
disengaging the energy transducer from a fluid flow until said one or more of the plurality of parameters are equal to or less than the respective preset limits.

39. The method according to claim 37, wherein the plurality of parameters comprise:
a free stream current speed in a column of water;
an actual depth of the hydrokinetic device in the column of water;
a mooring cable tension of a mooring cable;
a presence of a marine creature that may create a collision hazard;
a passage of a potentially catasrophic weather event;
an actual generator power output level; or
a power modulation factor.

40. The method according to claim 35, wherein the hydrokinetic device is deployed in an array of hydrokinetic devices, the method further comprising:
sending an actual generator power output level measurement signal to a station; and
receiving an individual power modulation factor from the station.

41. The method according to claim 40,
wherein the actual generator power output level is aggregated at the station with another actual generator power output level received from another one of the hydrokinetic devices in the array of hydrokinetic devices; or
wherein the individual power modulation factor is generated based on a target aggregate power output level for all of the hydrokinetic devices in the array of hydrokinetic devices and an actual aggregate power output level for all of the hydrokinetic devices in the array of hydrokinetic devices.

42. The method according to claim 35, wherein the hydrokinetic device is deployed in an array of hydrokinetic devices, the method further comprising:
receiving an individual power modulation factor from a station,
wherein the adjusting the depth of the hydrokinetic device is further based on the individual power modulation factor.

43. A power generating device that harnesses kinetic energy from a water current and generates electrical energy, the device comprising:
an energy transducer that is configured to harness the kinetic energy;
an electrical generator that is coupled to the energy transducer;
a variable effector that is configured to effect at least one of a weight, a lift or a drag of the device;
a power output sensor that is configured to detect an actual generator power output level of the electrical generator; and
an onboard controller that is adapted to control the variable effector to change at least one of the weight, the lift, or the drag of the device to adjust an operating depth of the device based on a difference of the actual generator power output level and a target generator power output level.

44. A method for controlling a hydrokinetic device that includes an energy transducer, the method comprising:
setting a target free stream current speed for the hydrokinetic device;
monitoring an actual free stream current speed;
comparing the target free stream current speed to the actual free stream current speed to determine an error signal; and
adjusting a depth of the hydrokinetic device based on the error signal to maintain the hydrokinetic device at the target free stream current speed.

45. The method according to claim 44, wherein said adjusting a depth of the hydrokinetic device comprises:
invoking a power control protocol with depth change protocol.

46. The method according to claim 44, wherein the adjusting the depth of the hydrokinetic device comprises altering one of a weight, a lift or a drag of the hydrokinetic device based on the error signal.

47. The method according to claim 46, when the error signal is zero or near zero, the method further comprising:
exchanging lift for weight in equal amounts to minimize flow disturbances.

48. The method according to claim 44, wherein the energy transducer comprises a variable control rotor.

49. The method according to claim 44, further comprising:
determining a rotor size based on a single free stream current speed that occurs most frequently in a vertical water column; or
adjusting a rotor swept area based on the single free stream current speed that occurs most frequently in the vertical water column.

50. The method according to claim 44, further comprising:
monitoring a plurality of parameters;
comparing each of the plurality of parameters to preset limits established for each of said plurality of parameters; and
invoking a fault condition when one or more of the plurality of parameters exceed the preset limits established for said one or more of the plurality of parameters.

51. The method according to claim 50, wherein the fault condition comprises:
disengaging the energy transducer from a fluid flow until said one or more of the plurality of parameters are equal to or less than the respective preset limits.

52. The method according to claim 50, wherein the plurality of parameters comprise:

a free stream current speed in a column of water;
an actual depth of the hydrokinetic device in the column of water;
a mooring cable tension;
a presence of a marine creature that may create a collision hazard;
a passage of a potentially catastrophic weather event;
an actual, real-time generator power output level; or
a power modulation factor.

53. The method according to claim 44, wherein the hydrokinetic device is deployed in an array of hydrokinetic devices, each having an energy transducer, the method further comprising:
sending an actual generator power output level measurement signal to a station; and
receiving an individual power modulation factor from the station.

54. The method according to claim 53, wherein the actual generator power output level is aggregated at the station with another actual generator power output level received from another one of the hydrokinetic devices in the array of hydrokinetic devices.

55. The method according to claim 53, wherein the individual power modulation factor is generated based on a target aggregate power output level for all of the hydrokinetic devices in the array of hydrokinetic devices and an actual aggregate power output level for all of the hydrokinetic devices in the array of hydrokinetic devices.

56. The method according to claim 44, wherein the hydrokinetic device is deployed in an array of hydrokinetic devices, the method further comprising:
receiving an individual power modulation factor from a station,
wherein the depth of the hydrokinetic device is further adjusted based on the individual power modulation factor.

57. The method according to claim 44, wherein the energy transducer is a variable control rotor.

\* \* \* \* \*